United States Patent
Hamilton et al.

(10) Patent No.: US 12,261,989 B2
(45) Date of Patent: Mar. 25, 2025

(54) LIGHT FIELD SAMPLING METHOD

(71) Applicant: Avalon Holographics Inc., St. John's (CA)

(72) Inventors: Matthew Hamilton, St. John's (CA); Chuck Rumbolt, St. John's (CA); Donovan Benoit, St. John's (CA); Matthew Troke, St. John's (CA); Robert Lockyer, St. John's (CA); Thomas Butyn, St. John's (CA)

(73) Assignee: Avalon Holographics Inc., St. John's (CA)

( * ) Notice: Subject to any disclaimer, the term of this patent is extended or adjusted under 35 U.S.C. 154(b) by 0 days.

(21) Appl. No.: 18/482,294

(22) Filed: Oct. 6, 2023

(65) Prior Publication Data
US 2024/0040103 A1 Feb. 1, 2024

Related U.S. Application Data

(63) Continuation of application No. 17/693,561, filed on Mar. 14, 2022, now Pat. No. 11,818,327.

(51) Int. Cl.
| | |
|---|---|
| *H04N 13/161* | (2018.01) |
| *G06T 7/557* | (2017.01) |
| *G06T 15/06* | (2011.01) |
| *G06T 17/00* | (2006.01) |
| *H04N 19/119* | (2014.01) |
| *H04N 19/146* | (2014.01) |
| *H04N 19/187* | (2014.01) |
| *H04N 13/00* | (2018.01) |

(52) U.S. Cl.
CPC .......... *H04N 13/161* (2018.05); *G06T 7/557* (2017.01); *G06T 15/06* (2013.01); *G06T 17/00* (2013.01); *H04N 19/119* (2014.11); *H04N 19/146* (2014.11); *H04N 19/187* (2014.11); *H04N 2013/0088* (2013.01)

(58) Field of Classification Search
None
See application file for complete search history.

(56) References Cited

U.S. PATENT DOCUMENTS

| | | | |
|---|---|---|---|
| 2014/0300869 A1* | 10/2014 | Hirsch | G02B 30/27 353/38 |
| 2019/0385323 A1 | 12/2019 | Doyen et al. | |
| 2022/0011742 A1* | 1/2022 | Shusteff | G05B 19/4099 |

* cited by examiner

*Primary Examiner* — Talha M Nawaz

(57) ABSTRACT

A system and methods for a CODEC driving a real-time light field display for multi-dimensional video streaming, interactive gaming and other light field display applications is provided applying a layered scene decomposition strategy. Multi-dimensional scene data is divided into a plurality of data layers of increasing depths as the distance between a given layer and the display surface increases. Data layers which are sampled using an effective resolution function to determine a suitable sampling rate and rendered using hybrid rendering, such as perspective and oblique rendering, to encode light fields corresponding to each data layer. The resulting compressed, (layered) core representation of the multi-dimensional scene data is produced at predictable rates, reconstructed and merged at the light field display in real-time by applying view synthesis protocols, including edge adaptive interpolation, to reconstruct pixel arrays in stages (e.g. columns then rows) from reference elemental images.

16 Claims, 16 Drawing Sheets

LIGHT FIELD SAMPLING METHOD

CLAIM OF PRIORITY

This application claims priority to U.S. patent application Ser. No. 62/809,390, filed on Feb. 22, 2019, and is a continuation of U.S. patent application Ser. No. 17/693,561 filed on 14 Mar. 2022, which is a continuation of U.S. patent application Ser. No. 17/128,294 filed on 21 Dec. 2020 granted as patent U.S. Pat. No. 11,330,244, which is a continuation of U.S. patent application Ser. No. 16/798,253 filed on 21 Feb. 2020 granted as patent U.S. Pat. No. 10,911,735, the contents of all of which are incorporated here by reference in their entirety.

FIELD OF THE INVENTION

The present disclosure relates to image (light field) data encoding and decoding, including data compression and decompression systems and methods for the provision of interactive multi-dimensional content at a light field display.

BACKGROUND OF THE INVENTION

Autostereoscopic, high-angular resolution, wide field of view (FOV), multi-view displays provide users with an improved visual experience. A three-dimensional display that can pass the 3D Turing Test (described by Banks et al.) will require a light field representation in place of the two-dimensional images projected by standard existing displays. A realistic light field representation requires enormous amounts of bandwidth to transmit the display data, which will comprise at least gigapixels of data. These bandwidth requirements currently exceed the bandwidth capabilities provided by technologies previously known in the art; the upcoming consumer video standard is 8K Ultra High-Def (UHD), which provides only 33.1 megapixels of data per display.

Compressing data for transmission is previously known in the art. Data may be compressed for various types of transmission, such as, but not limited to: long-distance transmission of data over internet or ethernet networks; or transmission of a synthetic multiple-view created by a graphical processing unit (GPU) and transferred to a display device. Such data may be used for video streaming, real-time interactive gaming, or any other light field display.

Several encoder-decoders (CODECs) for compressed light field transmission are previously known in the art. Olsson et al. teach compression techniques where an entire light field data set is processed to reduce redundancy and produce a compressed representation. Subcomponents (i.e., elemental images) of the light field are treated as a video sequence to exploit redundancy using standard video coding techniques. Vetro et al. teach multiple-view specializations of compression standards that exploit redundancy between the light field subcomponents to achieve better compression rates, but at the expense of more intensive processing. These techniques may not achieve a sufficient compression ratio, and when a good ratio is achieved the encoding and decoding processes are beyond real-time rates. These approaches assume that the entire light field exists in a storage disk or memory before being encoded. Therefore, large light field displays requiring large numbers of pixels introduce excessive latency when reading from a storage medium.

In an attempt to overcome hardware limitations for the delivery of multi-dimensional content in real-time, various methods and systems are known, however, these methods and systems present their own limitations.

U.S. Pat. No. 9,727,970 discloses a distributed, in parallel (multi-processor) computing method and apparatus for generating a hologram by separating 3D image data into data groups, calculating from the data groups hologram values to be displayed at different positions on the holographic plane and summing the values for each position for generating a holographic display. As a disclosure focused on generating a holographic display, the strategies applied involve manipulating fine at a smaller scale than light field and in this instance is characterized by the sorting and dividing of data according to colour, followed by colour image planes and then further dividing the plane images into sub-images.

US Patent Publication No. 20170142427 describes content adaptive light field compression based on the collapsing of multiple elemental images (hogels) into a single hogel. The disclosure describes achieving a guaranteed compression rate, however, image lossiness varies and in combining hogels as disclosed there is no guarantee of redundancy that can be exploited.

US Patent Publication No. 20160360177 describes methods for full parallax compressed light field synthesis utilizing depth information and relates to the application of view synthesis methods for creating a light field from a set of elemental images that form a subset of a total set of elemental images. The view synthesis techniques described herein do not describe or give methods to handle reconstruction artifacts caused during backwards warping.

US Patent Publication No. 20150201176 describes methods for full parallax compressed light field 3D imaging systems disclosing the subsampling of elemental images in a light field based on the distance of the objects in the scene being captured. Though the methods describe the possibility of down sampling the light field using simple conditions that could enhance the speed of encoding, in the worst case 3D scenes exist where no down-sampling would occur, and the encoding would fall back on transform encoding techniques which rely on having the entire light field to exist prior to encoding.

There remains a need for increased data transmission capabilities, improved data encoder-decoders (CODECs), and methods to achieve both improved data transmission and CODEC capabilities for the real-time delivery of multi-dimensional content to a light field display.

SUMMARY OF THE INVENTION

The present invention relates generally to 3D image data encoding and decoding for driving a light field display in real-time, which overcomes or can be implemented with present hardware limitations.

It is an object of the present disclosure to provide a CODEC with reduced system transmission latency and high bandwidth rates to provide for the production of a light field, in real time, with good resolution, at a light field display, for application in video streaming, and real-time interactive gaming. Light field or 3D scene data is deconstructed into subsets, which may be referred to as layers (corresponding to layered light fields), or data layers, sampled and rendered to compress the data for transmission and then decoded to construct and merge light fields corresponding to the data layers at a light field display.

According to an aspect there is computer-implemented method comprising:
  receiving a first data set comprising a three-dimensional description of a scene;

partitioning the first data set into a plurality of layers each representing a portion of the scene at a location with respect to a reference location; and encoding multiple layers to generate a second data set by performing a sampling operation on the layers comprising:

using an effective resolution function to determine a suitable sampling rate; and downsampling elemental images associated with a layer using the suitable sampling rate wherein a size of the second data set is smaller than a size of the first data set.

Embodiments can include one or more of the following features.

In an embodiment of the method, the second data set is transmitted to a remote device for the scene to be presented at a display device associated with the remote device.

In an embodiment of the method, encoding a layer further comprises performing a sampling operation on a corresponding portion of the first data set.

In an embodiment of the method, the sampling operation is based on a target compression rate associated with the second data set.

In an embodiment of the method, encoding multiple layers comprises:

rendering using ray tracing, a set of pixels to be encoded;

selecting multiple elemental images from a plurality of elemental images such that the set of pixels are rendered using the selected multiple elemental images; and sampling the set of pixels using a sampling operation.

In an embodiment of the method, sampling the set of pixels using a sampling operation comprises selecting multiple elemental images from a corresponding portion of the plurality of elemental images in accordance with a plenoptic sampling scheme.

In an embodiment of the method, wherein performing the sampling operation on the portion of the first data set comprises:

determining an effective spatial resolution associated with the layer and selecting multiple elemental images, from a corresponding portion of a plurality of elemental images, in accordance with a determined angular resolution.

In an embodiment of the method, the angular resolution is determined as a function of a directional resolution associated with the portion of the scene associated with the layer.

In an embodiment of the method, the angular resolution is determined as a field of view associated with a display device.

In an embodiment of the method, the three-dimensional description comprises light field data representing elemental images.

In an embodiment of the method, each elemental image is captured by one or more image acquisition devices.

In an embodiment of the method, light field data includes a depth map corresponding to the elemental images.

In an embodiment of the method, wherein the first data set comprises information on directions of normals on surfaces in the scene, the directions of the normals represented with respect to a reference direction.

In an embodiment of the method, reflection properties of at least some of the surfaces are non-Lambertian.

In an embodiment of the method, a set of multiple layers of the second data set comprise light fields.

In an embodiment of the method, the light fields are merged to create a final light field.

In an embodiment of the method, partitioning the first data set into a plurality of layers comprises restricting the depth range of each layer.

In an embodiment of the method, layers located closer to a display surface are narrower in width than layers located farther away from the display surface.

In an embodiment of the method, the partitioning of the first data set into a plurality of layers maintains a uniform compression rate across the scene.

In an embodiment of the method, the partitioning of the first data set into a plurality of layers comprises partitioning the light field display into inner and outer frustum volume layer sets.

In an embodiment of the method, the method is used to used to generate a synthetic light field for multi-dimensional video streaming, multi-dimensional interactive gaming, real-time interactive content, or other light field display scenarios.

In an embodiment of the method, the synthetic light field is generated only in a valid viewing zone.

BRIEF DESCRIPTION OF THE DRAWINGS

These and other features of the invention will become more apparent in the following detailed description in which reference is made to the appended drawings.

DETAILED DESCRIPTION OF THE INVENTION

Figure 1:
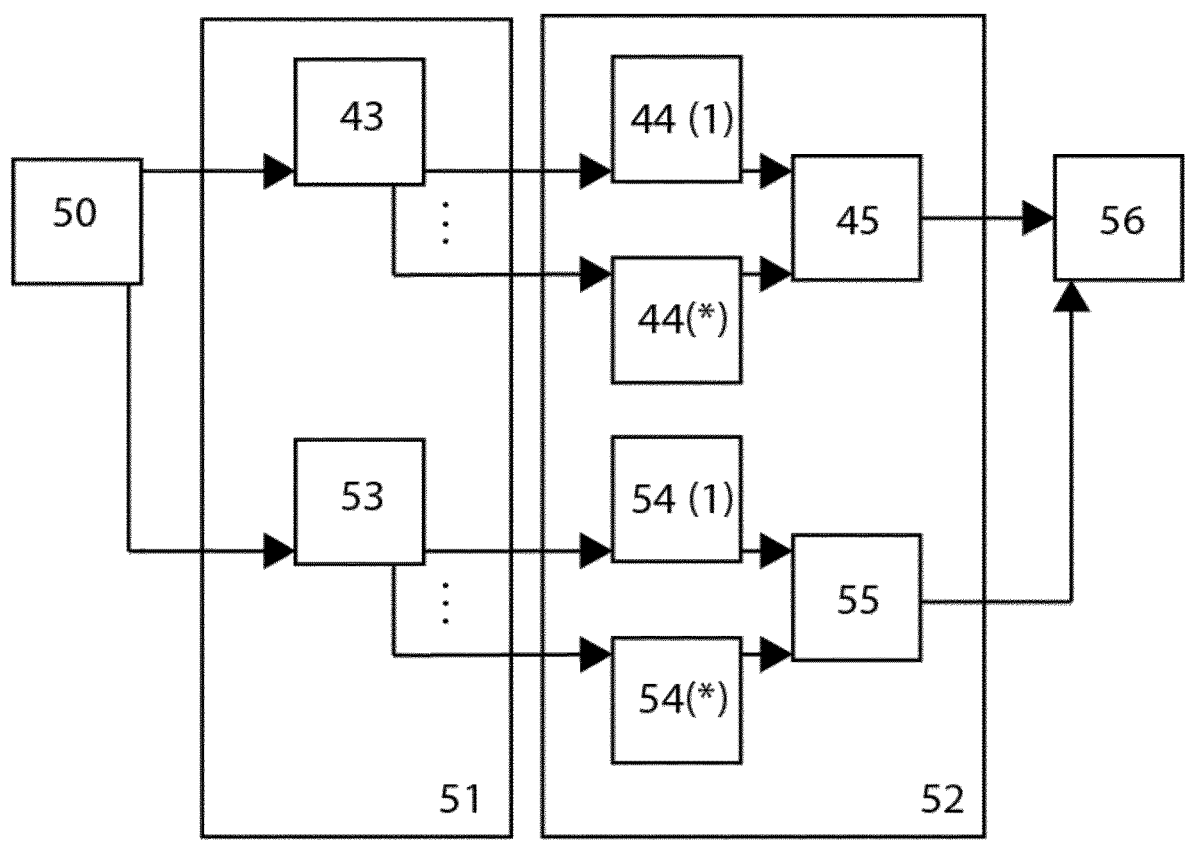
FIG. 1: is a schematic representation (block diagram) of an embodiment of a layered scene decomposition (CODEC) system according to the present disclosure.

The present invention relates generally to CODEC systems and methods for light field data or multi-dimensional scene data compression and decompression to provide for the efficient (rapid) transmission and reconstruction of a light field at a light field display.

Various features of the invention will become apparent from the following detailed description taken together with the illustrations in the Figures. The design factors, construction and use of the layered scene decomposition CODEC disclosed herein are described with reference to various examples representing embodiments which are not intended to limit the scope of the invention as described and claimed herein. The skilled technician in the field to which the invention pertains will appreciate that there may be other variations, examples and embodiments of the invention not disclosed herein that may be practiced according to the teachings of the present disclosure without departing from the scope and spirit of the invention.

Definitions

Unless defined otherwise, all technical and scientific terms used herein have the same meaning as commonly understood by one of ordinary skill in the art to which this invention pertains.

The use of the word "a" or "an" when used herein in conjunction with the term "comprising" may mean "one," but it is also consistent with the meaning of "one or more," "at least one" and "one or more than one."

As used herein, the terms "comprising," "having," "including" and "containing," and grammatical variations thereof, are inclusive or open-ended and do not exclude additional, unrecited elements and/or method steps. The term "consisting essentially" of when used herein in connection with a composition, device, article, system, use or method, denotes that additional elements and/or method steps may be present, but that these additions do not materially affect the manner in which the recited composition, device, article, system, method or use functions. The term "consisting of" when used herein in connection with a composition, device, article, system, use or method, excludes the presence of additional elements and/or method steps. A composition, device, article, system, use or method described herein as comprising certain elements and/or steps may also, in certain embodiments consist essentially of those elements and/or steps, and in other embodiments consist of those elements and/or steps, whether or not these embodiments are specifically referred to.

As used herein, the term "about" refers to an approximately +/−10% variation from a given value. It is to be understood that such a variation is always included in any given value provided herein, whether or not it is specifically referred to.

The recitation of ranges herein is intended to convey both the ranges and individual values falling within the ranges, to the same place value as the numerals used to denote the range, unless otherwise indicated herein.

The use of any examples or exemplary language, e.g. "such as", "exemplary embodiment", "illustrative embodiment" and "for example" is intended to illustrate or denote aspects, embodiments, variations, elements or features relating to the invention and not intended to limit the scope of the invention.

As used herein, the terms "connect" and "connected" refer to any direct or indirect physical association between elements or features of the present disclosure. Accordingly, these terms may be understood to denote elements or features that are partly or completely contained within one another, attached, coupled, disposed on, joined together, in communication with, operatively associated with, etc., even if there are other elements or features intervening between the elements or features described as being connected.

As used herein, the term "light field" at a fundamental level refers to a function describing the amount of light flowing in every direction through points in space, free of occlusions. Therefore, a light field represents radiance as a function of position and direction of light in free space. A light field can be synthetically generated through various rendering processes or may be captured from a light field camera or from an array of light field cameras.

A light field may be described most generally as a mapping between a set of points in 3D space with a corresponding set of directions onto a set or sets of energy values. In practice, these energy values would be red, green, blue color intensities, or potentially other radiation wavelengths.

As used herein, the term "light field display" is a device which reconstructs a light field from a finite number of light field radiance samples input to the device. The radiance samples represent the color components red, green and blue (RGB). For reconstruction in a light field display, a light field can also be understood as a mapping from a four-dimensional space to a single RGB color. The four dimensions include the vertical and horizontal dimensions (x, y) of the display and two dimensions describing the directional components (u, v) of the light field. A light field is defined as the function:

$$LF:(x,y,u,v) \rightarrow (r,g,b)$$

For a fixed $x_f$, $y_f$, LF($x_f$, $y_f$, u, v) represents a two dimensional (2D) image referred to as an "elemental image". The elemental image is a directional image of the light field from the fixed $x_f$, $y_f$ position. When a plurality of elemental images are connected side by side, the resulting image is referred to as an "integral image". The integral image can be understood as the entire light field required for the light field display.

As used herein, the term "description of a scene" refers to a geometric description of a three-dimensional scene that can be a potential source from which a light field image or video can be rendered. This geometric description may be represented by, but is not limited to, points, quadrilaterals, and polygons.

As used herein, the term "display surface" may refer to the set of points and directions as defined by a planar display plane and physical spacing of its individual light field hogel elements, as in a traditional 3D display. In the present disclosure, displays, as described herein, can be formed on curved surfaces, thus the set of points then would reside on the curved display surface, or any other desired, display surface geometry that may be imagined. In the abstract mathematical sense, a light field may be defined and represented on any geometrical surface and may not necessarily correspond to a physical display surface with actual physical energy emission capabilities As used herein, the term "elemental image" represents a two dimensional (2D) image, $LF(x_f, y_f, u, v)$, for a fixed $x_f$, $y_f$, $LF(x_f, y_f, u, v)$. The elemental image is a directional image of the light field from the fixed $x_f, y_f$ position.

As used herein, the term "integral image" refers to a plurality of elemental images connected side by side, the resulting image therefore referred to as the "integral image". The integral image can be understood as the entire light field required for the light field display.

As used herein, the term "layer" refers to any two parallel or non-parallel boundaries, with consistent or variable width, parallel or non-parallel to a display surface.

As used herein, the term "pixel" refers to a light source and light emission mechanism used to create a display.

It is contemplated that any embodiment of the compositions, devices, articles, methods and uses disclosed herein can be implemented by one skilled in the art, as is, or by making such variations or equivalents without departing from the scope and spirit of the invention.

Layered Scene Decomposition (LSD) CODEC System and Methods

The CODEC according to the present disclosure applies a strategy of drawing upon known sampling, rendering, and view synthesis methods for generating light field displays, adapting said strategies for use in conjunction with a novel layered scene decomposition strategy as disclosed herein, including its derivation, implementation and applications.

3D Displays

A conventional display as previously known in the art consists of spatial pixels substantially evenly-spaced and organized in a two-dimensional array allowing for an idealized uniform sampling. By contrast, a three-dimensional display requires both spatial and angular samples. While the spatial sampling of a typical three-dimensional display remains uniform, the angular samples cannot necessarily be considered uniform in terms of the display's footprint in angular space. For a review of various light field parameterizations for angular ray distributions, please see U.S. Pat. No. 6,549,308.

The angular samples, also known as directional components of the light field, can be parameterized in various ways, such as the planar parameterizations taught by Gortler et. al in "The Lumigraph". When the light field function is discretized in terms of position, the light field can be understood as a regularly-spaced array of planar-parameterized pinhole projectors, as taught by Chai in "Plenoptic Sampling". For a fixed $x_f, y_f$ the elemental image $LF(x_f, y_f, u, v)$ represents a two-dimensional image which may be understood as an image projected by a pinhole projector with an arbitrary ray parameterization. For a light field display, the continuous elemental image is represented by a finite number of light field radiance samples. For an idealized, planar parameterized pinhole projector, said finite number of samples are mapped into the image plane as a regularly-spaced array (the regular spacing within the plane does not correspond to a regular spacing in the corresponding angular directional space).

In the case of a typical 3D light field display, the set of points and directions would be defined by the planar display plane and physical spacing of its individual light field hogel elements. However, it is known that displays can be formed on curved surfaces, thus the set of points then would reside on the curved display surface, or any other desired, display surface geometry that may be imagined. In the abstract mathematical sense, a light field can be defined and represented on any geometrical surface and may not necessarily correspond to a physical display surface with actual physical energy emission capabilities. The concept of surface light field in the literature illustrates this case, as shown by Chen et al.

The consideration of planar parameterizations is not intended to limit the scope or spirit of the present disclosure, as the directional components of the light field can be parameterized by a variety of other arbitrary parameterizations. For example, lens distortions or other optical effects in a physically embodied pinhole projector can be modeled as distortions of the planar parameterization. In addition, display components may be defined through a warping function, such as taught by Clark et al. in "A transformation method for the reconstruction of functions from nonuniformly spaced samples."

A warping function $\alpha(u, v)$ defines a distorted planar parameterization of the pinhole projector, producing arbitrary alternate angular distributions of directional rays in the light field. The angular distribution of rays propagating from a light field pinhole projector is determined by the pinhole projector's focal length f and a corresponding two dimensional warping function $\alpha(u, v)$.

An autostereoscopic light field display projecting a light field for one or more users is defined as:

$$D=(M_x, M_y, N_u, N_v, f, \alpha, D_{LP})$$

Where $(M_x, M_y)$ are the horizontal and vertical dimensions of the display's spatial resolution and $(N_u, N_v)$ are the horizontal and vertical dimensions of the display's angular resolution components. The display is an array of idealized light field projectors, with pitch $D_{LP}$, focal length f, and a warping function $\alpha$ defining the distribution of ray directions for the light field projected by the display.

A light field $LF(x, y, u, v)$ driving a light field display $D=(M_x, M_y, N_u, N_v, f, \alpha, D_{LP})$ requires $M_x$ light field radiance samples in the x direction, $M_y$ light field radiance samples in the y direction, and $N_u$ and $N_v$ light field radiance samples in the u and v directions. While D is defined with a single warping function $\alpha$, each of the light field planar-parameterized pinhole projectors within the array of idealized light field pinhole projectors may have a unique warping function $\alpha$, if significant microlens variations exist in a practical pinhole projector causing the angular ray distribution to vary significantly from one microlens to another microlens.

Light Field Display Rendering

Figure 2:
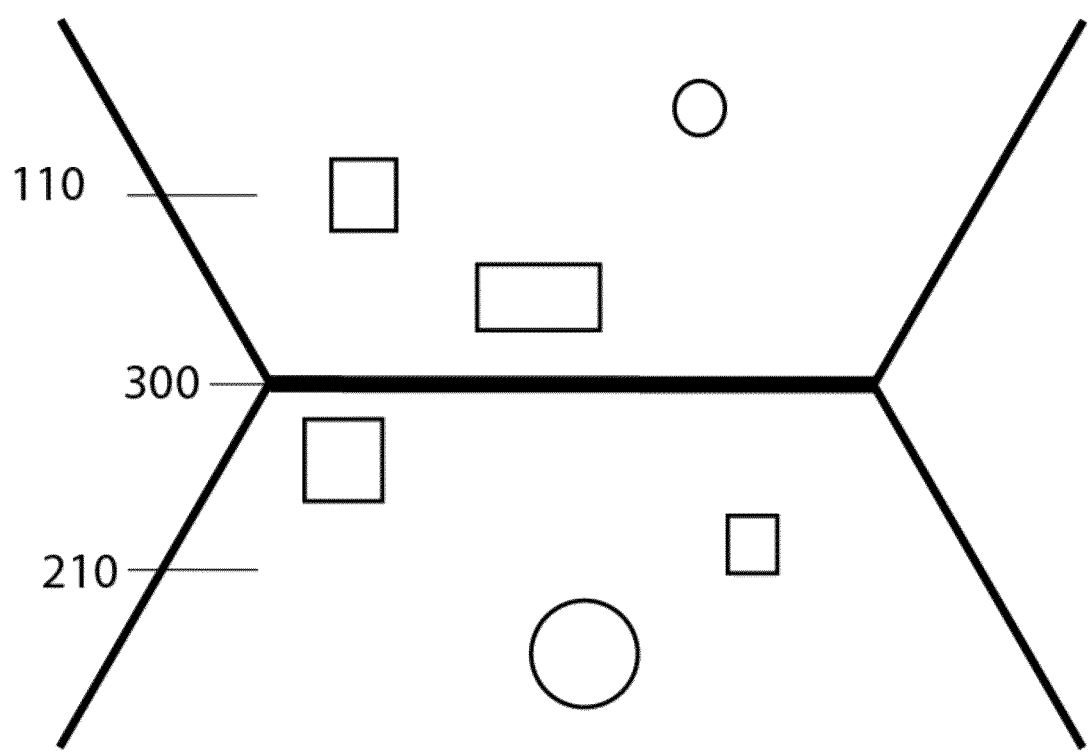
FIG. 2: is a schematic top-down view of the inner frustum volume and outer frustum volume of a light field display.

In "Fast computer graphics rendering for full parallax spatial displays," Halle et al. provide a method for rendering objects located within an inner frustum volume and outer frustum volume of the display. FIG. 2 illustrates a light field display representing objects within a volumetric region defined by these two separate viewing frusta, with the inner frustum volume (110) located behind the display surface (300) (i.e., within the display) and the outer frustum volume (210) located in front of the display surface (i.e. outside of the display). As illustrated, various objects (shown schematically as prismatic and circular shapes) are located at varying depths from the display surface (300).

Halle et al. teach a double frustum rendering technique, where the inner frustum volume and outer frustum volume are separately rendered as two distinct light fields. The inner frustum volume $LF_O(x, y, u, v)$ and outer frustum volume $LF_P(x, y, u, v)$ are recombined into the single light field $LF(x, y, u, v)$ through a depth merging process.

The technique uses a pinhole camera rendering model to generate the individual elemental images of the light field. Each elemental image (i.e. each rendered planar-parameterized pinhole projector image) requires the use of two cameras: one camera to capture the inner frustum volume and one camera to capture the outer frustum volume. Halle et al. teach rendering a pinhole projector image at a sampling region of the light field using a standard orthoscopic camera and its conjugate pseudoscopic camera. For a pinhole camera C, the corresponding conjugate camera is denoted as C*.

To capture an elemental image within a light field display with projectors parameterized using warping function $\alpha$, a generalized pinhole camera based on a re-parameterization of an idealized planarly-parameterized pinhole camera is used. As taught by Gortler et al., a pinhole camera C with a focal length f has light rays defined by a parameterization created by two parallel planes. Pinhole camera C captures an image $I_C(u, v)$, where $(u, v)$ are coordinates in the ray parameterization plane. The generalized pinhole camera, $C_\alpha$, is based upon a planar parameterized camera warped using a two dimensional, continuous, invertible time-warping function, as taught by Clark et al. With a warping function $\alpha(u, v)$, the inverse is $\gamma(u, v)$. Therefore, the image of $C_\alpha$, $I_{C\alpha}=I_C(\alpha(u, v))$.

Given the generalized pinhole camera, $C_\alpha$, a conjugate generalized camera $C_\alpha$* is formed to complete double frustum rendering. The views generated from a $M_x \times M_y$ grid of generalized pinhole camera pairs are rendered to render the light field for the light field display.

Therefore, the set of all generalized pinhole camera pairs that must be rendered to produce light field $LF(x, y, u, v)$ for a given light field display $D=(M_x, M_y, N_u, N_v, f, \alpha, D_{LP})$ is defined as:

$$\{(C_\alpha, C_\alpha^*)(x,y) | 1 \leq x \leq M_x, 1 \leq y \leq M_y\}$$

A set of orthoscopic cameras ($O=\{(C_\alpha(x, y) | 1 \leq x \leq M_x, 1 \leq y \leq M_y\}$) capture the light field image corresponding to the inner frustum volume and a set of conjugate generalized cameras ($P=\{(C_\alpha^*(x, y) | 1 \leq x \leq M_x, 1 \leq y \leq M_y\}$) capture the image corresponding to the outer frustum volume. As described above, the inner frustum volume and outer frustum volume are combined into a single light field.

Data Compression for Light Field Display

Piao et al. utilize a priori physical properties of a light field in order to identify redundancies in the data. The redundancies are used to discard elemental images based on the observation that elemental images representing neighboring points in space contain significant overlapped information. This avoids performing computationally complex data transforms in order to identify information to discard. Such methods do not utilize depth map information associated with each elemental image.

In "Compression for Full-Parallax Light Field Displays," Graziosi et al. propose criteria to sub-sample elemental images based on simple pinhole camera coverage geometry to reduce light field redundancy. The downsampling technique taught by Graziosi et al. is simpler than the complicated basis decompositions often employed in other CODEC schemes for two-dimensional image and video data. Where an object is located deep within a scene, the light field is sampled at a smaller rate. For example, when two separate pinhole cameras provide two different fields of view, there is very little difference from one elemental image to the next elemental image, and the fields of view from the two pinhole cameras overlap. While the views are subsampled based on geometric (triangle) overlap, the pixels within the views are not compressed. Because these pixels can be substantial, Graziosi et al. compress the pixels with standard two-dimensional image compression techniques.

Graziosi et al. teach that the sampling gap ($\Delta EI$) between elemental images, based on the minimum depth of an object d, can be calculated as follows, where $\theta$ represents the light field display's field of view and P represents the lens pitch of the integral imaging display:

$$\Delta EI = \frac{(2d)\tan(\theta/2)}{P}$$

This strategy provides a theoretically lossless compression for fronto-parallel planar surfaces when there are no image occlusions. As shown in the formula, the sampling gap increases with d, providing an improved compression rate when fewer elemental images are required. For sufficiently small d, $\Delta EI$ can reach 0. Therefore, this downsampling technique gives no guaranteed compression rate. In a scene with multiple small objects, where the objects are close to the screen or are at the screen distance, each elemental image would have at least some pixels at a 0 depth and this technique would provide no gains, i.e. $\Delta EI=0$ throughout the integral image.

Graziosi et al. equate the rendering process with the initial encoding process. Instead of producing all of the elemental images, this method only produces the number needed to reconstruct the light field while minimizing any loss of information. Depth maps are included with the elemental images selected for encoding and the missing elemental images are reconstructed using well-established warping techniques associated with depth image-based rendering (DIBR). The selected elemental images are further compressed using methods similar to the H.264/AVC method, and the images are decompressed prior to the final DIBR-based decoding phase. While this method provides improved compression rates with reasonable signal distortion levels, no time-based performance results are presented. Such encoding and decoding cannot provide good low-latency performance for high bandwidth rates. In addition, this method is limited to use for a single object that is far away from the display surface; in scenes with multiple overlapping objects and many objects close to the display surface, the compression would be forced back to use H.264/AVC style encoding.

Chai teaches plenoptic sampling theory to determine the amount of angular bandwidth required to represent fronto-parallel planar objects at a particular scene depth. Zwicker et al. teach that the depth of field of a display is based on the angular resolution, with more resolution providing a greater depth of field. Therefore, objects close to the display surface are represented adequately with lower angular resolution, while far objects require larger angular resolutions. Zwicker et al. teach the maximum display depth of field with ideal projective lenses based on planar parameterization is:

$$Z_{DOF} = \frac{fP_l}{P_p}$$

where $P_l$ is the lens pitch and $P_p$ is the pixel pitch and f is the focal length of the lenses. In a three-dimensional display with an isotropic directional resolution (i.e. $N=N_u=N_v$), $N=P_l/P_p$. Therefore, $Z_{DOF}=fN$.

To determine the angular resolution required to represent the full spatial resolution of the display, at a given depth d, the equation is rearranged as:

$$N_{res}(d) = \frac{d}{f}$$

Therefore, each focal length distance into the scene adds another pixel of angular resolution required to fully represent objects at the given spatial resolution of the display surface.

Layered Scene Decomposition and Sampling Scheme

The sampling gap taught by Graziosi et al. and the plenoptic sampling theory taught by Zwicker et al. provide complimentary light field sampling strategies: Graziosi et al. increase downsampling for distant objects (ΔEI) while Zwicker et al. increase down-sampling for near objects ($N_{res}$). However, when downsampling a single light field representing a scene, the combination of these strategies does not guarantee compression. Therefore, the present disclosure divides a multiple-dimensional scene into a plurality of layers. This division into a plurality of (data) layers is referred to herein as a layered scene decomposition. Where $K_1$ and $K_2$ are natural numbers, we define $L=(K_1, K_2, L^O, L^P)$, partitioning the inner and outer frustum volumes of a three-dimensional display. The inner frustum is partitioned into a set of $K_1$ layers, where $L^O=\{l_1^O, l_2^O \ldots l_{k_1}^O\}$. Each inner frustum layer is defined by a pair of boundaries parallel to the display surface at distances $d_{min}(l_i^O)$ and $d_{max}(l_i^O)$ for $1 \leq i \leq K_1$ from the display surface. The outer frustum is partitioned into a set of $K_2$ layers, where $L^P=\{l_1^P, l_2^P \ldots l_{k_2}^O\}$. Each outer frustum layer is defined by a pair of boundaries parallel to the display surface at distances $d_{min}(l_i^P)$ and $d_{max}(l_i^P)$ for $1 \leq i \leq K_2$ from the display surface. In alternate embodiments, the inner and outer frustum volumes may be divided by layering schemes differing from each other and the pair of boundaries can be but also may not be parallel to the display surface.

Each of the layered scene decomposition layers has an associated light field (herein also referred to as a "light field layer") based on the scene restrictions to the planar bounding regions of the layer. Consider a layered scene decomposition $L=(K_1, K_2, L^O, L^P)$ for a light field display $D=(M_x, M_y, N_u, N_v, f, \alpha, D_{LP})$ with an inner frustum layer $l_i^P \in L^P$ for $1 \leq i \leq K_1$, or an outer frustum layer $l_j^O \in L^O$ for $1 \leq j \leq K_2$. The inner frustum light field $LF_{l_i^O}$ is generated from the set of generalized pinhole cameras $O=\{C_\alpha(x, y) | 1 \leq x \leq M_x, 1 \leq y \leq M_y\}$. This equation is constrained such that only the space at distance d from the light field display surface, where $d_{min}(l_i^P) \leq d \leq d_{max}(l_i^P)$, is imaged. Therefore, for an inner frustum layer with a fixed x, y and $C_a(x, y) \in O$, we calculate $LF_{l_i^O}(x, y, u, v) = I_{C_a^{(x,y)}}$. Similarly, the outer frustum light field $LF_{l_i^P}$ is generated from the set of generalized pinhole cameras $P=\{C_a(x, y) | 1 \leq x \leq M_x, 1 \leq y \leq M_y\}$. This equation is constrained such that only the space at distance d from the light field display surface, where $d_{min}(l_i^P) \leq d \leq d_{max}(l_i^P)$, is imaged. Therefore, for an outer frustum layer with a fixed x, y and $C_a(x, y) \in P$, we calculate $LF_{l_i^P}=I_{C_a^{(x,y)}}$.

The sets of light fields for the inner and outer frustum regions relative to the layered scene decomposition L can be further defined. Assume a light field display $D=(M_x, M_y, N_u, N_v, f, a, D_{LP})$ with a layered scene decomposition $L=(K_1, K_2, L^O, L^P)$. The set of inner frustum region light fields is defined as $O^{LF}=\{LF_{l_i^O} | 1 \leq i \leq K_1\}$. The set of outer frustum region light fields is defined as $P^{LF}=\{LF_{l_i^P} | 1 \leq i \leq K_2\}$.

As defined, a layered scene decomposition generates a light field for each layer. For any layered scene decomposition, orthoscopic cameras generate inner frustum volume light fields and pseudoscopic cameras generate outer frustum volume light fields. If a scene captured by these generalized pinhole camera pairs is comprised of only opaque surfaces, each point of the light field has an associated depth value which indicates the distance from the generalized pinhole camera plane to the corresponding point in space imaged. When given a light field $LF_{l_i}^O \in O^{LF}$ or $LF_{l_i^O} \in P^{LF}$, the $LF_{l_i}^O$ depth map is formally defined as $D_m[LF_{l_i}^O](x, y, u, v)$, and the $LF_{l_i^P}$ depth map is formally defined as $D_m[LF_{l_i^P}](x, y, u, v)$. The depth maps $D_m=\infty$ where there are no surface intersection points corresponding to the associated imaging generalized pinhole camera rays. Across their domains, $d_{min}(l_i^P) \leq D_m[LF_{l_i^P}](x, y, u, v) \leq d_{max}(l_i^P)$ and $d_{min}(l_i^O) \leq D_m[LF_{l_i^O}](x, y, u, v) \leq d_{max}(l_i^O)$. In other words, depth maps associated with a layered scene decomposition layer's light field are bound by the depth bounds of the layer itself.

A merging operation can re-combine the layered scene decomposition layer sets back into the inner and outer frustum volumes, or $LF_O$ and $LF_P$. The inner and outer frustum volume light fields are merged with the merging operator $*_m$. For example, when given two arbitrary light fields, $LF_1(x, y, u, v)$ and $LF_2(x, y, u, v)$, where $i=\text{argmin}_{j \in (1,2)} D_m[LF_j](x, y, u, v)$, $*_m$ is defined as:

$$LF_1(x,y,u,v) *_m (LF_2(x,y,u,v) = LF_i(x,y,u,v)$$

Therefore, $LF_O(x, y, u, v)$ and $LF_P(x, y, u, v)$ can be recovered from the sets $O^{LF}$ and $P^{LF}$ by merging the light fields associated with the inner and outer frustum layers. For example:

$$LF_O = LF_{l_1^O} * mLF_{l_2^O} * m \ldots * mLF_{l_{K_1}^O}$$

$$LF_P = LF_{l_1^P} * mLF_{l_2^P} * m \ldots * mLF_{l_{K_1}^P}$$

The present disclosure provides a layered scene decomposition operation and an inverse operation which merges the data to reverse said decomposition. Performing a layered scene decomposition with K layers is understood to create K times as many individual light fields. The value of the layered scene decomposition is in the light fields induced by the layers; these light field layers are more suitable for downsampling than the original total light field or the inner frustum volume or outer frustum volume light fields, as the total data size required for multiple downsampled layered scene decomposition light field layers with an appropriate sampling scheme is significantly less than the size of the original light field.

The skilled technician in the field to which the invention pertains will appreciate that there are multiple types of sampling schemes that can successfully sample a light field. The sampling scheme S provided is not intended to limit or depart from the scope and spirit of the invention, as other sampling schemes, such as specifying individual sampling rates for each elemental image in the layered scene decomposition layer light fields, can be employed. Relatively simple sampling schemes can provide an effective CODEC with greater sampling control; therefore, the present disclosure provides a simple sampling scheme to illustrate the disclosure without limiting or departing from the scope and spirit of the invention.

A light field sampling scheme provided according to the present disclosure represents a light field encoding method. Given a display $D=(M_x, M_y, N_u, N_v, f, a, D_{LP})$ and a layered scene decomposition $L=(K_1, K_2, L^O, L^P)$, the present disclosure provides a sampling scheme S associated with L as an $M_x \times M_y$ binary matrix $M_S[l_i]$ associated with any layer $l_i$ in $L^O$ or $L^P$ and a mapping function $R(l_i)$ to map each layer $l_i$ to a pair $R(l_i)=(n_x, n_y)$. A binary ({0,1}) entry in $M_S[l_i]$ at $(x_m, y_m)$ indicates if the elemental image $LF_{l_i}(x_m, y_m, u, v)$ is included in the sampling scheme: a (1) indicates $LF_{l_i}(x_m, y_m, u, v)$ is included, and a (0) indicates $LF_{l_i}(x_m, y_m, u, v)$ is not included. $R(l_i)=(n_x, n_y)$ indicates the elemental images in light field $LF_{l_i}$ are sampled at a resolution of $n_x \times n_y$.

The present disclosure also provides a layered scene decomposition light field encoding process that draws upon plenoptic sampling theory. The following description pertains to the inner frustum volume $L^O$ of a layered scene decomposition L, but the outer frustum volume $L^P$ may be encoded in a similar fashion.

For each $l_i \in L^O$, the depth map of the corresponding light field $LF_{l_i}$ is restricted to d in the range $d_{min}(l_i^O) \le d \le d_{max}(l_i^O)$. Based on the sampling scheme presented above, the present disclosure creates a sampling scheme S using the following equation to guide the creation of $M_S[l_i^O]$:

$$\Delta EI(d_{min}(l_i^O)) = \frac{(2d_{min}(l_i^O))\tan(\theta/2)}{D_{LP}}$$

In other words, $\Delta EI$ guides the distance between "1" entries in the $M_S$ matrix associated with each layered scene decomposition layer. The following equation sets the resolution of the individual elemental images $$R(l_i^O) = \frac{d_{max}(l_i^O)}{f}, \frac{d_{max}(l_i^O)}{f}$$

in a layer:

$$N_{res}(d_{max}(l_i^O)) = \frac{d_{max}(l_i^O)}{f}$$

This sampling scheme, using both $\Delta EI$ and $N_{res}$ to drive individual layered scene decomposition layer sampling rates, can be considered as a layered plenoptic sampling theory sampling scheme (otherwise referred to herein as "plenoptic sampling scheme"). This plenoptic sampling scheme is based on a display utilizing the plenoptic sampling theory identity function $\alpha(t)=t$. This per-layer sampling scheme provides lossless compression for fronto-parallel planar scene objects where the objects within a layer do not occlude each other.

The assumption of only fronto-parallel planar scene objects is restrictive and does not represent typical scenes; inevitably there are intra-layer occlusions, especially for layered scene decomposition layers that are larger in size. To capture and encode a full range of potential scenes without introducing significant perceivable artifacts, the system can draw upon information in addition to the light field plenoptic sampling scheme of the present disclosure.

For example, surfaces are locally approximated by planar surfaces at various slanting angles. In "On the bandwidth of the plenoptic function," Do et al., theorize time-warping techniques allowing for the spectral characterization of slanted light field display surfaces. This work suggests that a necessary decrease in downsampling and the need for precise characterization of local bandwidth changes is induced by the degree of surface slanting, the depth of objects in the scene, and the positioning of objects at the FOV edge. Therefore, if signal distortions from fronto-parallel geometry deviations are perceptually significant, residue representations can adaptively send additional or supplemental elemental image data (dynamically altering the static sampling scheme) to compensate for losses incurred.

The present disclosure therefore provides for the identification as "core" or "residue" information for the encoding and decoding of the light field by the CODEC. When given a light field display D and a corresponding layered scene decomposition L with an associated sampling scheme S, the present disclosure considers the encoded, downsampled light fields associated with L and S, as well as the number of layered scene decomposition layers and the depth of said layers, as the "core" representation of a light field encoded and decoded by the CODEC. Any additional information transmitted along with the core (encoded) representation of the light field that may be required during the decoding process is considered as the "residue" representation of the light field to be processed by the CODEC and used together with the core representation of the light field to produce the final light field displayed.

Many layered scene decompositions and sampling schemes that may be defined in the framework defined above can still exhibit issues with holes due to occlusions after they are merged and the original light field is reconstructed. It is an observation that object occlusions that occur between objects in separate layers do not lead to holes after reconstruction. However, objects that may occlude each other that are both located within the same layer can lead to holes, especially for certain sampling schemes.

To be specific, if sampling within a particular layer is such that the gap between sampled elemental images is large, then there is a high likelihood that occluded objects can be under-represented, thus resulting in holes. One solution to this is to simply sample elemental images at a higher rate. A higher sampling rate however results in a lower compression rate. Adding more elemental images therefore can result in the inclusion of significant redundant information. What is needed is a more discriminant method that can include additional information that helps to fill in holes while not contributing to redundancy in the overall representation. For example, consider a layered scene decomposition:

$$L=(K_1, K_2, L^O, L^P)$$

For each layer $l_i$ in $L^O$ or $L^P$, we can define a set of residue layers:

$$R(l_i)=\{r(l_i)(j)|1 \le j \le K_i\}$$

Where $K_i$ is a natural number describing the number of residue layers required for layer $l_i$. For each residue layer, like layered scene decomposition layers, there is a light field associated with the layer:

$$LF_{r(l_i)j}$$

In the most general description, these additional layers can be free form with no further restrictions. In practice, additional information that can help to deal with occlusions is represented in these residue layers. One way to implement this is to have residue layers have the same sampling scheme as their parent layered scene decomposition layer, however one possible variation might be to sample the residue layers with a lower directional resolution in order to tightly control the compression rate of the LSD plus residue layer combination.

Specifically, the residue layers may be defined as additional layers corresponding to the concept of Deep G-Buffers. Thus:

$$D_m[LF_{l_i}](x,y,u,v) < D_m[LF_{r(l_i^{(1)})}](x,y,u,v) < \ldots < D_m[LF_{r_{l_i(K_i)}}](x,y,u,v)$$

In this case, residue layers sit in contrast to layered scene decomposition layers in the sense that the depth ranges of each layer are not fixed by pre-decided depth divisions of the layered scene decomposition layer scheme but are based on the depth layer characteristics inherent to the geometry in the scene being represented.

Layer-Based Compression Analysis

Predictable compression rates are required to create a real-time rendering and transmission system, together with downsampling criteria (which do not indicate achievable compression rates). The following provides a compression analysis of the present disclosure's layered scene decomposition encoding strategy.

As already described, downsampling a light field based on plenoptic sampling theory alone does not offer guaranteed compression rates. The present disclosure provides a downsampling light field encoding strategy, allowing for a low-latency, real-time light field CODEC. In one embodiment, complementary sampling schemes based on plenoptic sampling theory, using both $\Delta EI$ and $N_{res}$ are employed to drive individual layered scene decomposition layer sampling rates. The layered scene decomposition, representing the total 3D scene as a plurality of light fields, expands the scene representation by a factor of the number of layers. The present disclosure further contemplates that when layer depths are chosen appropriately, compression rates can be guaranteed when combined with plenoptic sampling theory based downsampling.

For a light field $LF_{l_i}$ corresponding to a given layered scene decomposition layer $l_i$ the layer's restricted depth range provides a guaranteed compression rate for the layer's light field. The achievable compression ratio from downsampling a scene completely contained within a single layer can be explained in the following theorem:

Theorem 1

Consider a display $D=(M_x, M_y, N_u, N_v, f, a, D_{LP})$ with an isotropic directional resolution $N=N_u=N_v$, a layered scene decomposition L and an associated sampling scheme $S=(M_S, R)$. Assume a layered scene decomposition layer $l_i$ with the corresponding light field $LF_{l_i}$ such that $d_{min}(l_i) < Z_{DOF}(D)$, and $M_S[LF_{l_i}]$ is selected so the distance between "1" entries is set to $\Delta EI(d_{min}(l_i))$ and $R(l_i)N_{res}(d_{max}(l_i))$. The compression ratio associated with S relative to the layered scene decomposition layer $l_i$ is 1:

$$N^2 \left( \frac{d_{min}(l_i)}{d_{min}(l_i)} \right).$$

Proof 1

Consider a layered scene decomposition layer within the maximum depth of field of the display, where $$d_{min}(l_i) = \frac{Z_{DOF}}{c} \text{ and } d_{max}(l_i) = \frac{Z_{DOF}}{d} \text{ for } 0 < c, d \leq Z_{DOF}.$$

Therefore, $$c = \frac{z_{DOF}}{d_{min}(l_i)} \text{ and } d = \frac{Z_{DOF}}{d_{max}(l_i)} \text{ and } d/c = \frac{d_{min}(l_i)}{d_{max}(l_i)}.$$

Therefore $\Delta EI(d_{min}(l_i))=N/c$ and $N_{res}(d_{max}(l_i))=N/d$.

Based on this rate of sub-sampling, the system requires every $(N/c)^{th}$ elemental image, therefore providing a compression ratio of $1:(N/c)^2$. The elemental image sub-sampling provides a $1:d^2$ compression ratio. Therefore, the total compression ratio is $1:(N/c)^2 * 1:d^2 = 1:N^2(d/c)^2$. The compression factor term $$c_f = \frac{d_{min}(l_i)}{d_{max}(l_i)}$$

determines the compression ratio.

There may be an alternate case where $d_{min}(l_i)=Z_{DOF}$ and $(d_{max}(l_i))$ can extend to any arbitrary depth. We know $\Delta EI(Z_{DOF})=N$ and $N_{res}$ attains the maximum possible value of N for all depths $d \geq Z_{DOF}$. Based on this rate of sub-sampling, the system requires every $N^{th}$ elemental image, thus providing the light field with a $1:N^2$ compression ratio. Adding additional layered scene decomposition layers beyond $Z_{DOF}$ adds redundant representational capability when representing fronto-parallel planar objects. Therefore, when creating a core encoded representation, the total scene may be optimally decomposed with the maximum depth of field in the layers.

Given the compression calculation expression for downsampling a layered scene decomposition layer, we can determine how the compression factor varies as the layer parameters vary. For a layer of a fixed width, or $d_{max}(l_i) - d_{min}(l_i)=w$ for some w, the $c_f$ term is minimized when $d_{max}(l_i) - d_{min}(l_i)$ is closest to the display surface. Therefore, layered scene decomposition layers located closer to the display surface require a narrower width to achieve the same compression ratio as layers located further away from the display surface. This compression rate analysis can extend to scenes that are partitioned into multiple adjacent fronto-planar layers located in the space from the display surface until the depth $Z_{DOF}$.

Theorem 2

Consider a display $D=(M_x, M_y, N_u, N_v, f, a, D_{LP})$ with an isotropic directional resolution $N=N_u=N_v$, a layered scene decomposition L and an associated sampling scheme $S=(M_S, R)$. Let $S_{LF}=M_x M_y N_u N_v$, denoting the number of image pixels in the light field. The compression ratio of the layered scene decomposition representation can be defined as:

$$\frac{A}{S_{LF}} = (1/N^2) \sum_{i=1}^{K} (1/c_f(i)^2) = (1/N^2) \sum_{i=1}^{K} \left( \frac{d_{max}(l_i)}{d_{min}(l_i)} \right)^2$$

Proof 2

For a given layered scene decomposition layer down-sampled with compression ratio:

$$S_{layer}(i) = \left( \frac{1}{N^2 c_f(i)^2} \right) S_{LF}$$

To calculate the compression ratio, the size of each layer in the compressed form is computed and summed, and the total compressed layer size is divided by the size of the light field. Consider a sum where the size of the compressed set of layers is:

$$A = \sum_{i=1}^{K} \left( \frac{1}{N^2 c_f(i)^2} \right) S_{LF}$$

Therefore, the compression ratio of the combined layers is:

$$\frac{A}{S_{LF}} = (1/N^2) \sum_{i=1}^{K} (1/c_f(i)^2) = (1/N^2) \sum_{i=1}^{K} \left( \frac{f + i\Delta L}{f + (i-1)\Delta L} \right)^2$$

In a system where the layered scene decomposition layers are of variable width, with $d_{min}(i)$ and $d_{max}(i)$ representing the front and back boundary depths of the $i^{th}$ layer, the compression ratio of the layered scene decomposition representation is:

$$\frac{A}{S_{LF}} = (1/N^2) \sum_{i=1}^{K} (1/c_f(i)^2) = (1/N^2) \sum_{i=1}^{K} \left( \frac{d_{max}(i)}{d_{min}(i)} \right)^2$$

The sum $\sum_{i=1}^{K}(1/c_f(i)^2)$ for constant layered scene decomposition layers is monotonically decreasing and tending towards 1.

Therefore, layered scene decomposition layers located closer to the display surface achieve a lower compression ratio than layers of the same width located further away from the display surface. To maximize efficiency, layered scene decomposition layers with a narrower width are located closer to the display surface, and wider layered scene decomposition layers are located further away from the display surface; this placement maintains a uniform compression rate across the scene.

Number and Size of Layered Scene Decomposition Layers

To determine the number of layers and the size of layers required for the layered scene decomposition, a light field display with an $\alpha(t)=t$ identity function, is provided as an example. The consideration of this identity function is not intended to limit the scope or spirit of the present disclosure, as other functions can be utilized. The skilled technician in the field to which the invention pertains will appreciate that while the display $D=(M_x, M_y, N_u, N_v, f, a, D_{LF})$ is defined with a single identity function $\alpha$, each light field planar-parameterized pinhole projector within an array of planar-parameterized pinhole projectors may have a unique identity function $\alpha$.

To losslessly represent fronto-planar surfaces (assuming no occlusions), a single layered scene decomposition layer with a front boundary located at depth $Z_{DOF}$ represents the system from $Z_{DOF}$ to infinity. Lossless compression may be defined as class of data compression algorithms that allows the original data to be perfectly reconstructed from the compressed data To generate a core representation, layered scene decomposition layers beyond the deepest layer located at the light field display's maximum depth of field are not considered, as these layers do not provide additional representative power from the core representation perspective; this applies to both the inner and outer frustum volume layer sets.

Within the region from the display surface to the maximum depth of field of the display (for both the inner and outer frustum volume layer sets), the layered scene decomposition layers utilize maximum and minimum distance depths that are integer multiples of the light field display f value. Layered scene decomposition layers with a narrower width provide a better per-layer compression ratios, thereby providing better overall scene compression ratios. However, a greater number of layers in the decomposition increases the amount of processing required for decoding, as a greater number of layers must be reconstructed and merged. The present disclosure accordingly teaches a layer distribution scheme with differential layer depths. In one embodiment, layered scene decomposition layers (and by correlation the light fields represented by said layers) with a more narrow width are located closer to the display surface, and the layer width (i.e., the depth difference between the front and back layer boundaries) increases exponentially as the distance from the display surface increases.

Layer Directional Resolution Sampling Based on Asymptotic Resolution

When using layered scene decomposition to design a suitable light field CODEC, there are two main questions. One is how to decompose the scene into subsets (layers). The design question that naturally follows is how to down-sample the light fields associated with each of the layers. We refer to the down-sampling strategy as the "sampling scheme".

There can be many ways to construct a sampling scheme. The plenoptic sampling scheme presented in this disclosure which uses $\Delta EI$ and $N_{res}$ is one example. $N_{res}$ is an example of an effective resolution function. This scheme in theory will sample losslessly, if there are no occlusions and if all objects within layers are fronto-planar.

Existing video CODECs are used effectively without being perfectly lossless, instead where losses are taken, they are optimized to minimize the perceived effect of any artifacts present. Thus, we explore how potentially lossy down-sampling may be used while minimizing perceptual effect as a viable strategy for designing useful light field CODECs.

The concept of depth of field of a light field display presented by Zwicker et al. forms the basis of the $N_{res}$ plenoptic sampling criteria. This concept is based strictly on representation theory and the total representative capacity of the samples that make of a light field image. That total representative capacity is considered outside the context of an observer who views a light field display; one can say it is viewer-independent in that sense. In terms of a light field display and designing an optimal experience for observer, the representation capacity of the light field is only really relevant in terms of the image perceived by an observer and how their position relative to the display influences the image perception.

Figure 16:
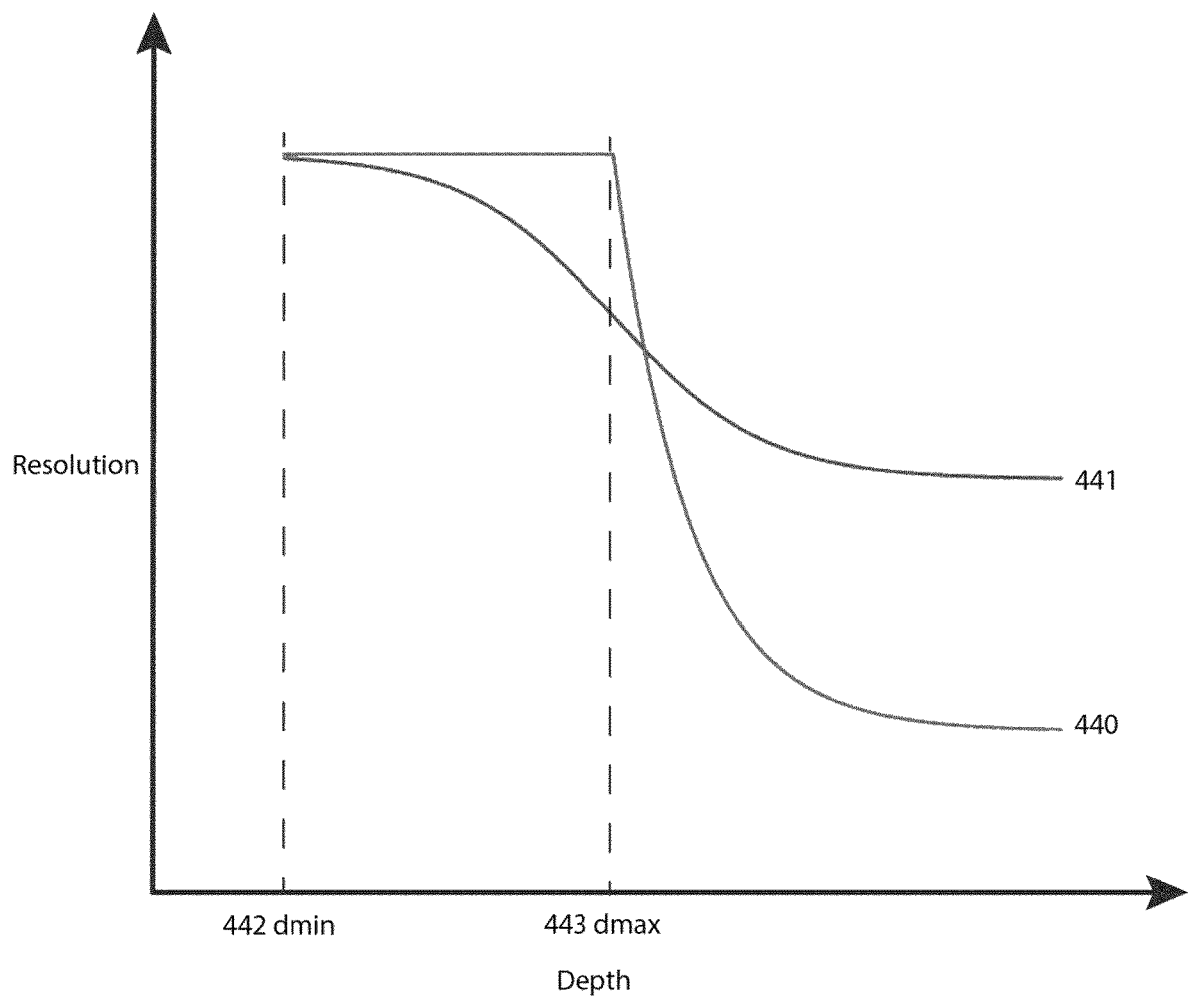
FIG. 16: graphically illustrates the asymptotic nature of effective resolution with respect to scene depth.

The concept of depth field as presented by Zwicker suggests that greater angular resolution for a light field will result in a greater 3D display volume within which the display will show objects at the display's full spatial resolution. The theory predicts a linear fall-off in resolution for objects at distances beyond the maximum depth of field distance from the display's surface (FIG. 16).

This resolution is viewer independent. We propose that it is over-conservative as it does not consider the observer's proximity to display. We consider a setup with a physical observer at some given distance from the display. From a sampling perspective, when an observer views a display, the angular sampling rate sampled by the observer is a function of the observer's distance. It can be shown that in theory, based on a physical observer's distance to the display we can create an equation which estimates the observed resolution as a function of distance of the objects from the observer. We present a particular derivation of such an equation here, but other equations or models of resolution fall-off can be used as well as empirical models of fall-off as observed through experimental or simulation studies of light field displays and observer models.

The model derived shows that an asymptotic resolution can be calculated for objects. Generally, the asymptotic resolution decreases as a function of observer distance. Therefore, if we can assume a maximum observer distance, it is reasonable to use the corresponding asymptotic resolution or other associated resolution fall-off function as a worse-case measure of resolution degradation at depth.

Consider the plenoptic sampling scheme which used $N_{res}$ as described previously. Assume we have a layer with minimum depth $d_{min}$ (442) and maximum depth $d_{max}$. (443) Then based on the $N_{res}$ formula, $d_{max}$ (443) determines the directional resolution required for the layer. In terms of the representation theory described in Zwicker for depth of field, that sampling rate fully represents the scene at its maximum resolution within the confines of the given layer. This is represented in FIG. 16.

Let us assume that in a given practical context, it is reasonable to define a maximum viewing distance for a light field display. Based on this maximum viewing distance, we can consider the associated fall-off function, as a function of directional resolution chosen for a potential sampling scheme for a given layer.

The resolution function can be plotted, as seen in FIG. 16, of various directional sampling rates less than that implied by $N_{res}$ ($d_{max}$) (443) and consider how it deviates from ideal (440) within the depth range from $d_{min}$ (442) to $d_{max}$ (443). For an asymptotic function, it may be observed that the deviation will become greater as a function of greater depth, but of course will not exceed the maximum based on the asymptotic value (441). The deviation represents signal loss; however, it can be quantified and has a bound based on the asymptotic value. Thus, this presents a framework within which layer down-sampling and any associated loss can be quantified and thus used in terms of guiding the design of an appropriate sampling scheme for an LSD-based light field CODEC.

A three-dimensional description of a scene is partitioned into a plurality of subsets and multiple layers or subsets are encoded to generate a second data set, smaller than a size of the first data set. The encoding of the layer or subset may include performing a sampling operation on the subset. An effective resolution function is used to determine a suitable sampling rate. Elemental images associated with a subsection are then downsampled using the determined suitable sampling rate.

Related works have focused on analyzing depth of field and how resolution degrades at depth in displays with multiple light-attenuating layers. These works still analyze depth of field as an observer-independent concept similarly to Zwicker et. al which describes the depth of field of a light field display as the range of depths in which a virtual plane oriented parallel to the display surface can be reproduced at the display's maximum spatial resolution. This framework however does not factor in the observer, it is based on effectively orthographic views of the scene. The information a particular viewer has access to from the light field from a given viewpoint in terms of the quality of objects at depth in a scene is addressed.

Alpaslan et. al performed a study to determine how perceived resolution changed at distance in a light field display in terms of varying optical and spatio-angular resolution parameters. It was shown that increased angular resolution reduces the decrease in perceived resolution at depth in the display. This analysis is based on patterns of oscillations that measure in cycles per space, where space is that in the inner and outer frustum of the display, as seen in the below equation.

$$p=p_o+s^*\tan \phi$$

Where p is the smallest feature size, $P_o$ is the pixel size, s is the depth into the screen and $\phi$ is the angular distance between two samples. This formula is based on simple geometric arguments and the assumption that directional rays of the display are distributed uniformly in angular space. It clearly shows that feature size increases with distance, however, this formula is formulated independent of a particular observer and what feature size the observer may resolve at depth.

In contrast, Dodgson analyzes how observers can occupy various viewing zones in front of a 3D display which correspond to density of projection from the display's angular components, but do not directly relate these viewing zones to apparent viewing quality of objects at depth.

One approach to dealing with small depth of field, or DoF, involves scaling content to fit within the target region. This technique does appear to produce a good result, but since it involves some optimization on the content, it appears it would not be immediately amenable to real-time datasets in an interactive setting. A simpler, fixed scheme re-scaling technique could work in a real-time setting yet would likely introduce unacceptable distortion artifacts such as cardboarding. Cardboarding may be defined as a pervasive artifact that occurs when visualizing 3D content is the so-called "cardboarding" effect, where objects appear flat due to depth compression.

In cases where all surfaces are Lambertian, it can be assumed that an observer is a pinhole camera. A real human eye is more accurately modeled as a finite aperture camera, which is an approach taken in other 3D display view simulation work. However, a pinhole camera is used for simplicity, as it can serve as an upper bound on quality over the finite aperture case in some sense. It is assumed that the canonical image forms the basis of the observer image. Thus, to examine the quality of the image, the canonical rays are considered. More specifically, it is assumed that the canonical image $I_C[D, O]$ can be related to the canonical image through a type of upscaling operation. The canonical image is a sampled version of a warped observer image. Applying the inverse warping function to the canonical image, a continuous version of it, would then give the observer image. The warping function can also be described as a projection function.

It is possible to present a formal definition of a 3D light field display in terms of various design parameters. Without loss of generality, it is assumed that the display is centered in 3D space at (x, y, z)=(0, 0, 0) and points at an observer in the positive z direction, with y direction pointing up. The formal definition is as follows:

Considering a light field display $D=(M_x, M_y, N_u, N_v, f, D_{LP})$ where ($M_x, M_y$) are the horizontal and vertical dimensions of the display's spatial resolution, ($N_u, N_v$) are the horizontal and vertical dimensions of the display's angular resolution components. It is assumed the display is an array of idealized light field projectors whose pitch is $D_{LP}$, and with a focal length f. Suppose the $M_x \times M_y$ array of light field projectors can be indexed $LFP_{ij}$ such that the first coordinate aligns with the x-axis and the second with the y-axis. Thus, results the set of light field projectors: $\{LFP_{ij}|1\leq i\leq M_x, 1\leq j\leq M_y\}$. For any particular light field projector, one may address each of the individual $N_u \times N_v$ pixels by $LFP_{ij}(u,v)$ for $1\leq u\leq N_u$ and $1\leq u\leq N_v$. Based on the focal length f of the display, one can compute an angular field of view, denoted as $\theta_{FOV}$.

It is known that a light field display can represent objects that are within a volumetric region defined by two separate viewing frusta, encompassing an area both behind and in front of the display surface. These two frusta are hereto referred to as the inner and outer frustum regions of a given display.

Defining an observer $O=(X_O, D_O, f_O)$ as a pinhole camera imaging a display with focal length $f_O$, with focal point located at $X_o$ and pointing in direction $D_O$, where $D_O$ is a 3D vector. For observer O, this is known as the observer image and denoted as $I_O$.

A particular observer, depending on its particular location and direction/orientation images a different subset of the possible output ray directions projected by the light field projectors of a display. These rays may be defined more precisely:

Given a display $D=(M_x, M_y, N_u, N_v, f, D_{LP})$ and an observer $O=(X_O, D_O, f_O)$. Defining the set of rays, one for each light field projector associated with D, defined by the line that connects $X_O$ and the center of each light field projector. Let $X_{ij}^c$ denote the center of $LFP_{ij}$. One then defines the set of lines $\{\overline{X_O X_{ij}^c}|1\leq i\leq M_x, 1\leq j\leq M_y\}$ as the set of canonical rays of observer O relative to display D. The canonical rays, it should be noted, only form a subset of the rays that would contribute to the observer image. It is straightforward to observe that the set of canonical rays of an observer is independent of the observer's direction $D_O$ and focal length $f_O$. Thus, the set of all possible observers at a particular location share the same set of canonical rays relative to a display.

For any canonical ray $\overline{X_O X_{ij}^c}$ here is an angular $(\theta_{ij}, \varphi_{ij})$ pair that represents the spherical coordinates of the vector associated with $\overline{X_O X_{ij}^c}$ Each of the $N_u \times N_v$ elements of $LFP_{ij}(u,v)$ also has a spherical coordinate representation which may be written as $(\theta(u), \varphi(v))$ as well as a spatial vector representation, denoted as $\overline{P_{u,v}}$.

The canonical rays for a given display and observer may be seen to sample intensity values from the light field projected by the display and its light field projectors. These intensity values may be observed to form a $M_x$ by $M_y$ image, further referred hereto as the canonical image relative to display D and observer O. This image is denoted as $I_C[D, O](x, y)$.

Considering a display's field of view $\theta_{FOV}$, there is a minimum distance that an observer must be located at in order to be able to see light from all the light field projector-based pixels on the display. Generally, for a smaller FOV, this distance becomes larger and for a large field of view the observer may come closer. This distance can be determined by trigonometry as:

$$d_O = \frac{M_x D_{LP}}{2\tan\left(\frac{\theta_{FOV}}{2}\right)}$$

Each light field projector represents a segment of a continuous smooth light field. Given a display and an observer, each of the canonical rays samples the light field using the intensities within its corresponding light field projector array. That is given a canonical ray $\overline{X_O X_{ij}^c}$, an intensity value is reconstructed based on a resampling operation performed on the intensity values contained in the light field projector image, $LFP_{ij}$. A common model employed here gives each ray implied by the light field projector image a spot width. This spot width allows one to describe a physical reconstruction of a light field, by giving each projector intensity value a physical angular spread.

To simplify the analysis, the point spread function (PSF) model is ignored to some extent. Instead, it is assumed that the canonical rays sample the light field from a particular $LFP_{ij}$ using a nearest neighbor interpolation scheme. Consider a ray from a canonical image corresponding to the intensity value $I_C[D, O](i, j)$, for some $(i, j)$. We supposed the ray vector $X_O X_{ij}^c$ can be represented using spherical coordinates as $(\theta_{ij}, \varphi_{ij})$. Let $$(u_n^{ij}, v_n^{ij}) = \mathrm{argmin}_{u,v} \arccos(\overline{X_O X_{ij}^c} \cdot \overline{P_{u,v}})$$

The indices $(u_n, v_n)$ represent the light field projector pixel which has minimum angular distance from the sampling canonical ray. Thus, by this nearest neighbor interpolation:

$$I_C[D,O](i,j) = LFP_{i,j}(u_n^{ij}, v_n^{ij})$$

This reconstruction model allows for an initially simpler analysis and understanding of the sampling geometry.

Based on the depth of field, or DoF, of a display concept, the ability of a 3D display to represent spatial resolution decreases as objects move beyond the maximum depth of field. Current light field or multiview displays appear to suffer from a small depth of field, due to relatively poor angular resolution and sampling density. It is obvious from viewing these displays that objects at any significant depth into the screen become quite blurry.

Objects in a 2D display, while lacking the additional perceptual cues of a 3D display, do not become unnaturally blurred at distance. In a standard 2D display, 3D objects that appear deep in a scene that are virtually distant from the display surface degrade in a natural way relative to the maximum resolution of the display. That is, as an object becomes more distant from the 2D display, its projected area on the 2D display is less, thus the number of pixels representing this projected area decrease with the size of the area. This corresponds to how more distant objects are projected to a smaller area on the retina (or an imaging plane of a camera) and thus less detail can be resolved. However, in a 3D display with relatively low angular resolution, objects at distance become blurry and are not represented at a resolution proportional to their projected area on the display surface.

It is proposed to measure the effective spatial resolution of a 3D display at depth in terms of how it compares to a pseudo equivalent 2D display. A 3D display is used to mimic a 2D display in a way by considering how a 3D display presents a fronto-parallel plane located in the display's inner frustum region. The plane's size increases with depth in order to fill the entire width of the viewing frustum relative to a given observer position. Let $d_P$ denote the z coordinate of the plane. This plane is referred hereto as plane $P_C(d_P, O)$.

Figure 15:
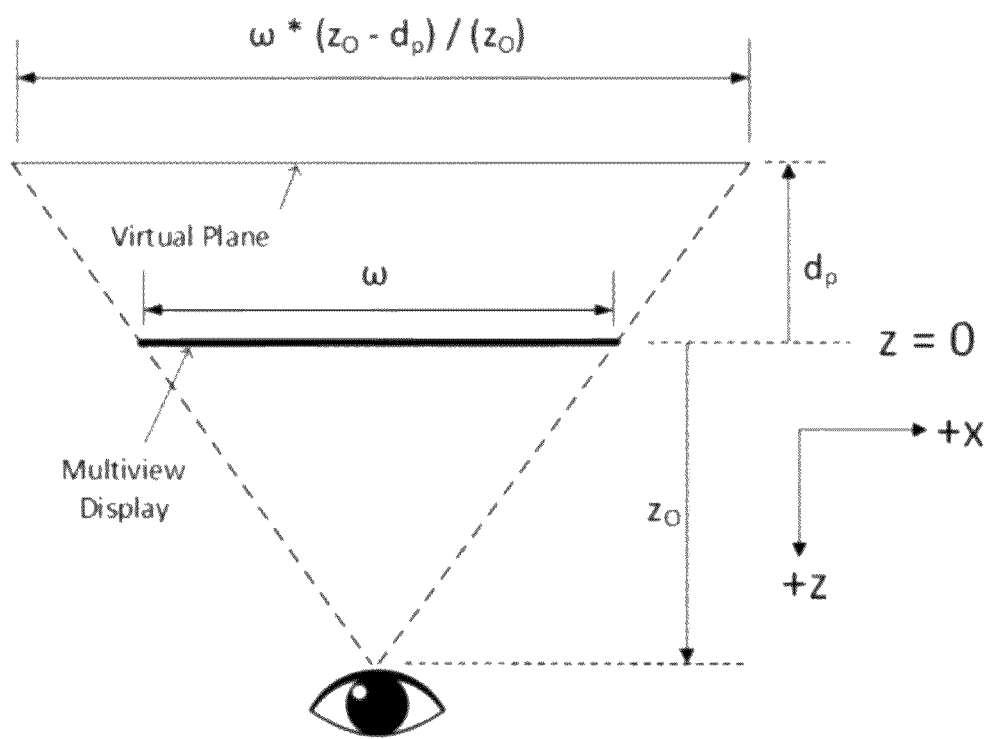
FIG. 15: illustrates observer-based constructed plane used to measure effective resolution at depth.

Consider an observer O located at $(x_O, z_O)$. Let the width of the display D be $\omega$. A plane is constructed such that for an observer at $(x_O, z_O)$, at whatever depth the plane is placed, its size is such that the plane projects onto each spatial pixel of the display. In other words, what is seen on the plane will take up the entire space of the display's surface as shown in FIG. 15.

To calculate the width W for the constructed plane located at depth $d_p$, a formula based on the geometry of similar triangles is used. It should be noted the positive z axis is pointing toward the observer from the display making $d_p$ a negative value in:

$$W = \omega \frac{z_O - d_p}{z_O}$$

Analysis has been conducted using a 1D display, for simplicity. For 1D analysis, a display will be defined as $$D = (M_x, N_u, f, D_{LP})$$

With light field projectors which are addressable as $LFP_i$ (u) for suitable u in the defined range. The observer will be defined as $O = (X_O)$ with $X_O$ being an x and z coordinate only. We let $X_i^C$ denote the center of $LFP_i$. The set of canonical rays of observer O relative to display D are $$\{\overline{X_O X_i^C} | 1 \leq i \leq M_x\}$$

The canonical image produced is $I_C\{D, O\}(x)$. A canonical ray $\overline{X_O X_i^C}$ has an angular representation $\theta_i$. Each of the $N_u$ elements of $LFP_i(u)$ has an angular representation $\theta(u)$ and a spatial vector representation which is denoted as $\overline{P_u}$. For nearest neighbor interpolation $$I_C[D,O](i) = LFP_i(u_n^i)$$

Where:

$$u_n^i = \operatorname{argmin} |\theta_i - \theta(u)|$$

Effective Resolution for Inner Frustum

To answer the question of how the resolution of a given observer degrades for scene elements in terms of distance from the display surface, the analysis is restricted to depths located in the inner frustum of the display. For simplicity, assumed as a 1-D display.

To quantify the effective resolution at depth, the key question to answer in this setting is: How do light field projector rays that contribute to reconstructing the incident canonical rays sample the plane $P_C(d_p, O)$? Modelled here are two sampling steps: (1) light field projector rays sample the plane and (2) incident canonical rays sample the light field from a subset of the light field projector rays. The problem is simplified by assuming that a canonical ray sample is constructed using just one element of a light field projector through nearest neighbor interpolation.

Theorem 1

Assume a display $D = (M_x, N_u, f, D_{LP})$ and an observer $O = (X_O, D_O, f_O)$. Let $z_O = \omega = M_x D_{LP}$. Therefore, effective resolution at depth, $d_p$, may be estimated by:

$$P_x = \frac{\omega \dfrac{z_O - d_p}{z_O}}{D_{LP} + -d_p \dfrac{2\tan \theta_{FOV}/2}{N_u}}$$

Proof:

Assume a plane $P(d_p, O)$. Distances are defined related to how the rays of the light field projectors sample the inner frustum and thus the plane $P(d_p, O)$. Consider the set of $M_x$ canonical rays $C = \{c_1, \ldots, c_{M_x}\}$, labeled such that $c_i$ is the ray that intersects $LFP_i$. The intensity associated with the ray $c_i$ then is $I_C[D, O](i)$.

Based on the defined nearest neighbor scheme, each ray $c_i \in C$ is mapped to a corresponding ray in $LFP_i$, indexed by $u_n^i$ as defined previously. There are two possible cases. In the first case, two adjacent canonical rays $c_i$ and $c_{i+1}$ both have nearest neighbors in their corresponding light field projectors, ($LFP_i$, $LFP_{i+1}$) with the same angle. That is, $u_n^{i+1} = u_n^i$. Another way to look at this is that adjacent canonical rays are mapped to parallel light field projector rays. In the second possible case, two adjacent canonical rays $c_i$ and $c_{i+1}$ are mapped to distinct rays in their corresponding light field projectors. That is, $u_n^{i+1} = u_n^i + k$, for integer $k \geq 1$. For displays where $N < M_x$ and assuming that an observer stands at distance at least $d_O$ from the display surface, this case will be $u_n^{i+1} = u_n^i + 1$.

Distances are now defined based on these two cases. For the first case, and two adjacent LFP rays are parallel with their distance being $D_{LP}$ by definition. In the second case, $$d = D_{LP} + q$$

$$q = -d_p \frac{2\tan(\theta_{FOV}/2)}{N_u}$$

This combination of parallel samples and diverging samples produces a non-uniform sampling pattern. It is proposed that the effective resolution of a display surface depth—observer trio is the size of the plane $P_C(d_p, O)$ divided by the largest sampling distance. This is because the largest sampling distance determines the smallest feature size that is guaranteed to be sampled.

That is to say that a 2D display with resolution $P_X$ will have the same smallest feature size as a particular display—surface depth—observer trio. For the inner frustum, the $P_X$ will be:

$$P_x = \frac{W}{d} = \frac{w \dfrac{z_O - d_p}{z_O}}{D_{LP} + -d_p \dfrac{2\tan(\theta_{FOV}/2)}{N_u}}$$

Given the formula for an estimate of effective resolution at depth, it is shown that the formula gives a curve with a minimum value in terms of the variable $d_p$. If the plane is at a very large depth (ie. $d_p \to -\infty$), the asymptotic minimum effective resolution is:

$$B_x = \lim_{d_p \to -\infty} P_X = \frac{\omega N_u}{z_O 2\tan(FOV/2)}$$

Effective Resolution for Outer Frustum

For the outer frustum, the value of $d_p$ will be positive based on the current coordinate system. When $d_p$ is positive, q becomes negative and therefore $d < D_{LP}$.

It is proposed that the effective resolution of a display surface depth-observer trio is the size of the plane divided by the largest sampling distance which is now $D_{LP}$.

Disparity Encoding/Decoding

The encoded layered scene decomposition representation of a light field produced from a sampling scheme applied to each layer is principally comprised of a plurality of pixels including RGB color and disparity. Generally speaking, selecting an appropriate bit width for the disparity (depth) field of the pixel is important, as the width of this field improves the accuracy of the operation during reconstruction. However, the use of an increased number of bits contributes negatively to the compression rate achieved.

In the present disclosure, each layer of RGB color and disparity pixels specified by the given sampling scheme has a specific range of disparity corresponding to the individual pixels. The present disclosure exploits this narrow range of disparity within each layered scene decomposition layer to increase the accuracy of the depth information. In conventional pixel representations, the range of disparity for an entire scene is mapped to a fixed number of values. For example, in 10-bit disparity encoding, there can only be 1024 distinct depth values. In the layered scene decomposition of the present disclosure, the same fixed number of values are applied to each layered scene decomposition layer, as each layer has known depth boundaries. This is advantageous as the transmission bandwidth can be reduced by decreasing the width of the depth channel, while maintaining pixel reconstruction accuracy. For example, when the system implements a disparity width of 8-bits and the scene is decomposed into 8 layered scene decomposition layers, a total of 2048 distinct disparity values can be used, with each layer having 256 distinct possible values based on 8-bit representation. This is more efficient than mapping the entire range of possible disparity values within the inner or outer frustum to a given number of bits.

The present disclosure utilizes the same number of bits, but the bits are interpreted and distinctly represent disparity within each layered scene decomposition layer. Since each layered scene decomposition layer is independent from each other, depth (bit) encoding can differ for each layer and can be designed to provide a more accurate fixed-point representation. For example, a layered scene decomposition layer closer to the display surface has smaller depth values and can use a fixed point format with a small number of integer bits and a large number of fractional bits, while layered scene decomposition layers further away from the display surface has larger depth values and can use a fixed point format with a large number of integer bits and a small number of fractional bits. The fractional bits are configurable on a per layer basis:

$$\text{MinFixedPoint}=1/(2^{FractionalBits})$$

$$\text{MaxFixedPoint}=2^{16-FractionalBits}-\text{MinFixedPoint}$$

Disparity is calculated from the depth in the light field post-processing stage and encoded using the following formula:

$$\text{ScaleFactor}=(\text{MaxFixedPoint}-\text{MinFixedPoint})/(\text{NearClipDisparity}-\text{FarClipDisparity})$$

$$\text{EncodedDisparity}=(\text{Disparity}-\text{FarClipDisparity})*\text{ScaleFactor}+\text{MinFixedPoint}$$

Disparity is decoded using the following formula:

$$\text{ScaleFactor}=(\text{MaxFixedPoint}-\text{MinFixedPoint})/(\text{NearClipDisparity}-\text{FarClipDisparity})$$

$$\text{UnencodedDisparity}=(\text{EncodedDisparity}-\text{MinFixedPoint})/\text{ScaleFactor}+\text{FarClipDisparity}$$

Figure 14:
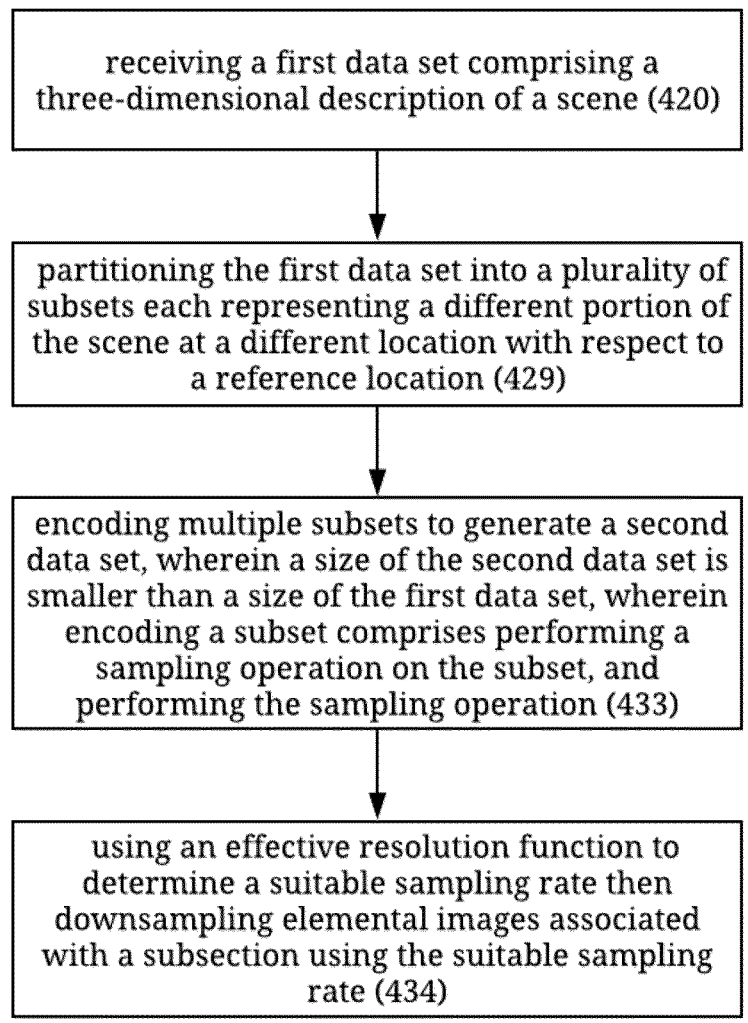
FIG. 14: illustrates an exemplary CODEC process flow including performing a sampling operation using an effective resolution function, according to the present disclosure.

FIG. 14 illustrates a computer-implemented method comprising:
- receiving a first data set comprising a three-dimensional description of a scene (420);
- partitioning the first data set into a plurality of layers each representing a different portion of the scene at a different location with respect to a reference location (429);
- partitioning data corresponding to at least one of the subsets into a plurality of subsections, wherein a location of a particular subsection is determined in accordance with geometry of at least a portion of an object represented within the scene (435); and encoding multiple layers and multiple subsections to generate a second data set, wherein a size of the second data set is smaller than a size of the first data set (424).

Generalized and Illustrative Embodiment—CODEC Implementation and Applications

Overview

The present disclosure defines an encoder-decoder for various types of angular pixel parameterizations, such as, but not limited to, planar parameterizations, arbitrary display parameterizations, a combination of parameterizations, or any other configuration or parameterization type. A generalized and illustrative embodiment of the present disclosure provides a method to generate a synthetic light field for multi-dimensional video streaming, multi-dimensional interactive gaming, or other light field display scenarios. A rendering system and processes are provided that can drive a light field display with real-time interactive content. The light field display does not require long-term storage of light fields, however, the light fields must be rendered and transmitted at low latency to support an interactive user experience.

Figure 7:
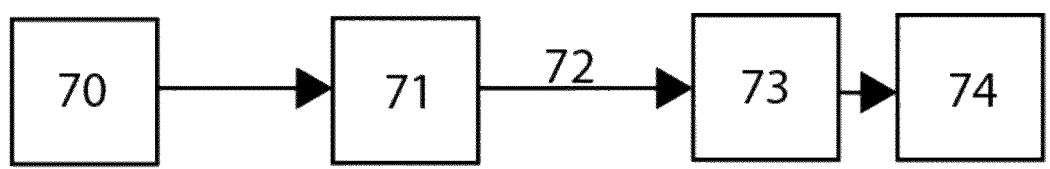
FIG. 7: illustrates schematically an exemplary CODEC system embodiment according to the present disclosure.

FIG. 7 provides a CODEC system overview of the generalized, illustrative embodiment of the present invention. A gaming engine or interactive graphics computer (70) transmits three-dimensional scene data to GPU (71). The GPU encodes the data and sends it over the display port (72) to a decoding unit (73) containing a decoding processor such as an FPGA or ASIC. The decoding unit (73) sends decoded data to a light field display (74).

FIG. 1 illustrates another generalized, exemplary layered scene decomposition CODEC system, where light field data from a synthetic or video data source (50) is input to encoder (51). A GPU (43) encodes the inner frustum volume data, dividing it into a plurality of layers, and GPU (53) encodes the outer frustum volume data, dividing it into an additional plurality of layers. While FIG. 1 illustrates separate GPUs (43, 53) dedicated for the inner and outer frustum volume layers, a single GPU can be utilized to process both the inner and outer frustum volume layers. Each of the layered scene decomposition layers are transmitted to decoder (52), where the plurality of inner frustum volume layers (44(1) through 44(*)) and the plurality of outer frustum volume layers (54(1) through 54(*)) of a light field are decoded and merged into a single inner frustum volume layer (45) and a single outer frustum volume layer (55). As per double frustum rendering, the inner and outer frustum volumes are then synthesized (merged) into a single, reconstructed set of light field data (56), otherwise referred to herein as a "final light field" or "display light field".

FIGS. 10 to 13 illustrate exemplary CODEC process implementations according to the present disclosure.

Figure 10:
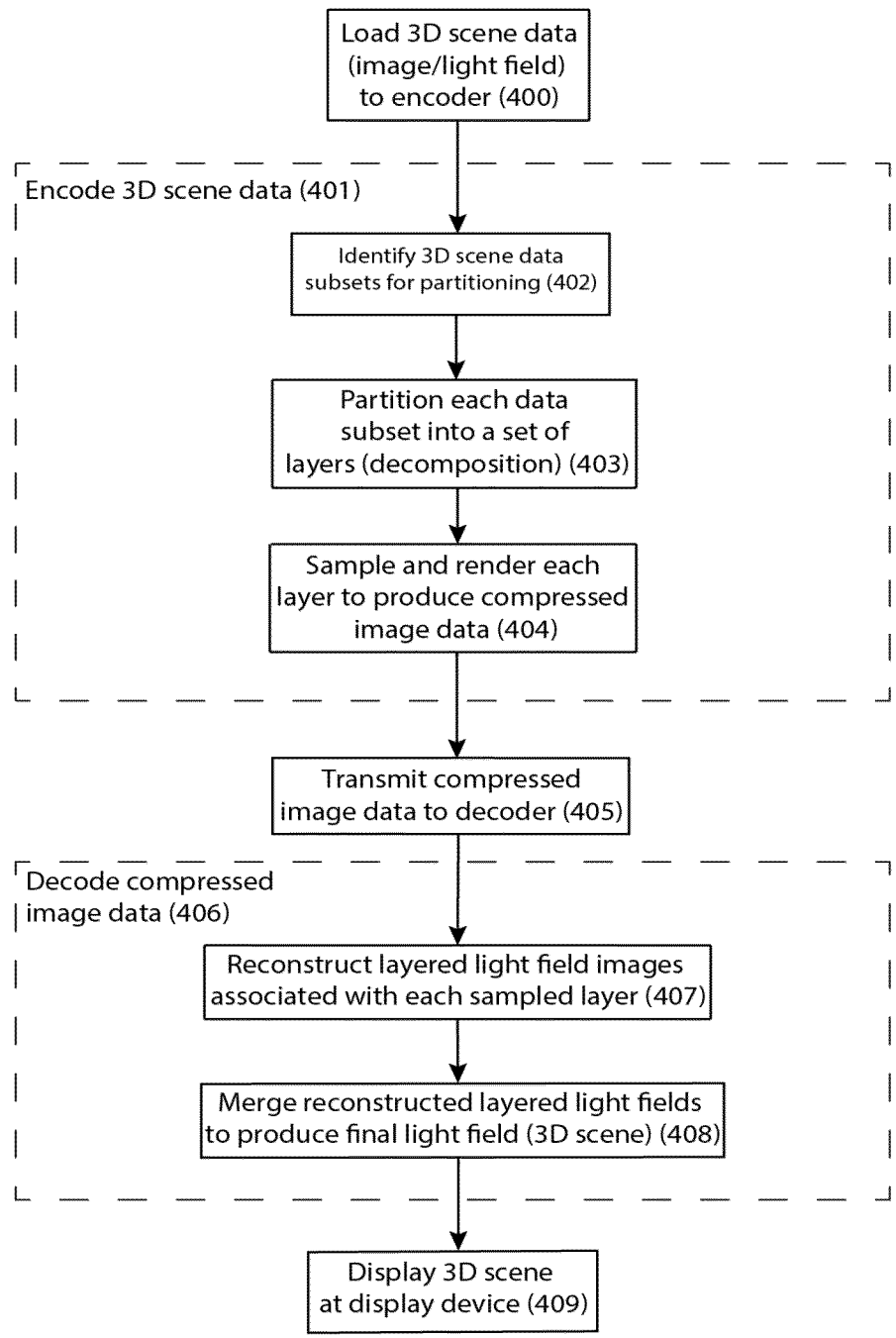
FIG. 10: illustrates an exemplary CODEC process flow according to the present disclosure.

FIG. 10 illustrates an exemplary layered scene decomposition CODEC method, whereby 3D scene data in the format of image description or light field data is loaded to an encoder (400) for encoding, whereupon data (sub)sets as illustrated in the figure, or alternatively the entire data set representing the 3D scene is partitioned (403). In the case of the identification of 3D scene data subsets for partitioning (402), it is understood that the identification process is a general process step reference which is intended to simply refer to the ability to partition the data set in one pass, or in groupings (e.g. to encode inner frustum and outer frustum data layers as illustrated in more detail in FIG. 11), as may be desired according to the circumstances. In this regard, the identification of data subsets may imply pre-encoding processing steps or processing steps also forming part of the encoding sub-process stage (401). Data subsets may be tagged, specified, confirmed, scanned and even compiled or grouped at the time of partitioning to produce a set of layers (decomposition of the 3D scene) (403). Following the partitioning of data subsets (403), each data layer is sampled and rendered according the present disclosure to produce compressed (image) data (404). Following data layer compression the compressed data is transmitted to a decoder (405) for the decoding sub-process (406) comprising decompression, decoding and re-composition steps to (re)construct a set of light fields (407), otherwise referred to herein as "layered light fields", layered light field images and light field layers. The constructed layered light fields are merged to produce the final light field (408) displaying the 3D scene (409).

Figure 13:
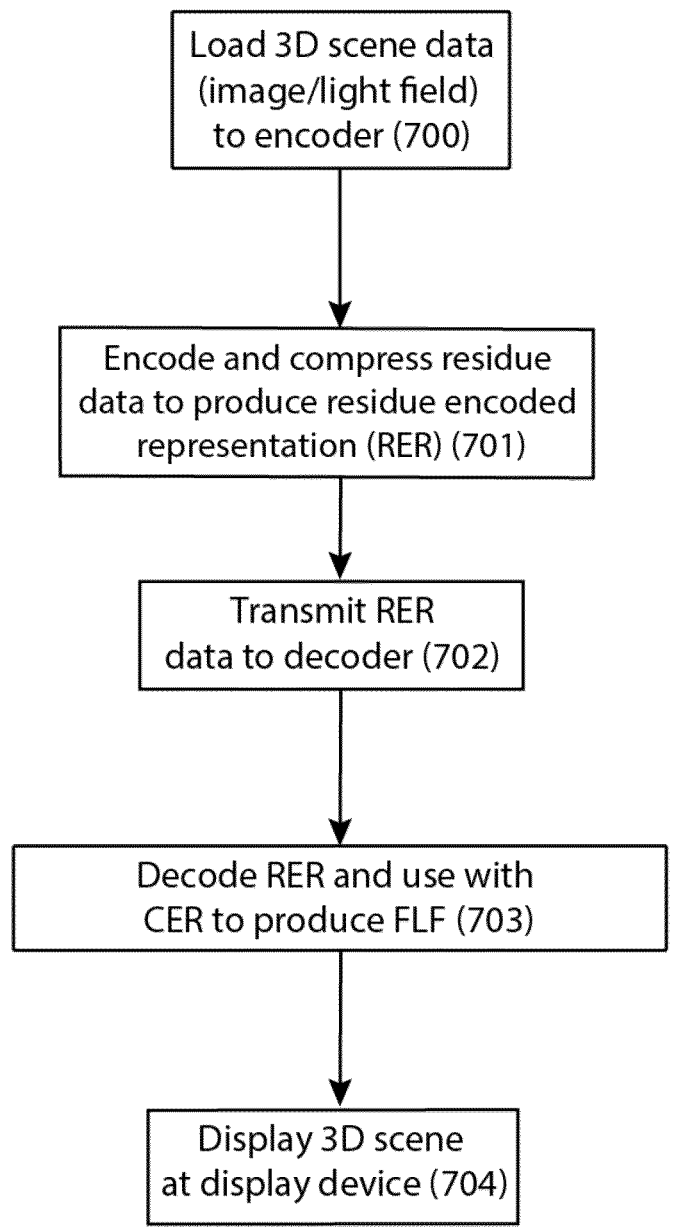
FIG. 13: illustrates an exemplary process flow for encoding and decoding residue image data for use with core image data to produce a (display/final) light field at a display according to the present disclosure.

An exemplary, parallel CODEC process is illustrated in FIG. 13 for optimizing the delivery of a light field representing a 3D scene in real-time (e.g. to minimize artifacts). The process comprises the steps of loading 3D scene data to an encoder (700), encoding and compressing the residue encoded representation (701) of the final light field, transmitting the residue encoded representation (702) to a decoder, decoding the residue encoded representation and using the residue encoded representation with the core encoded representation to produce the final light field (703) and display the 3D scene at a display (704).

Figure 11:
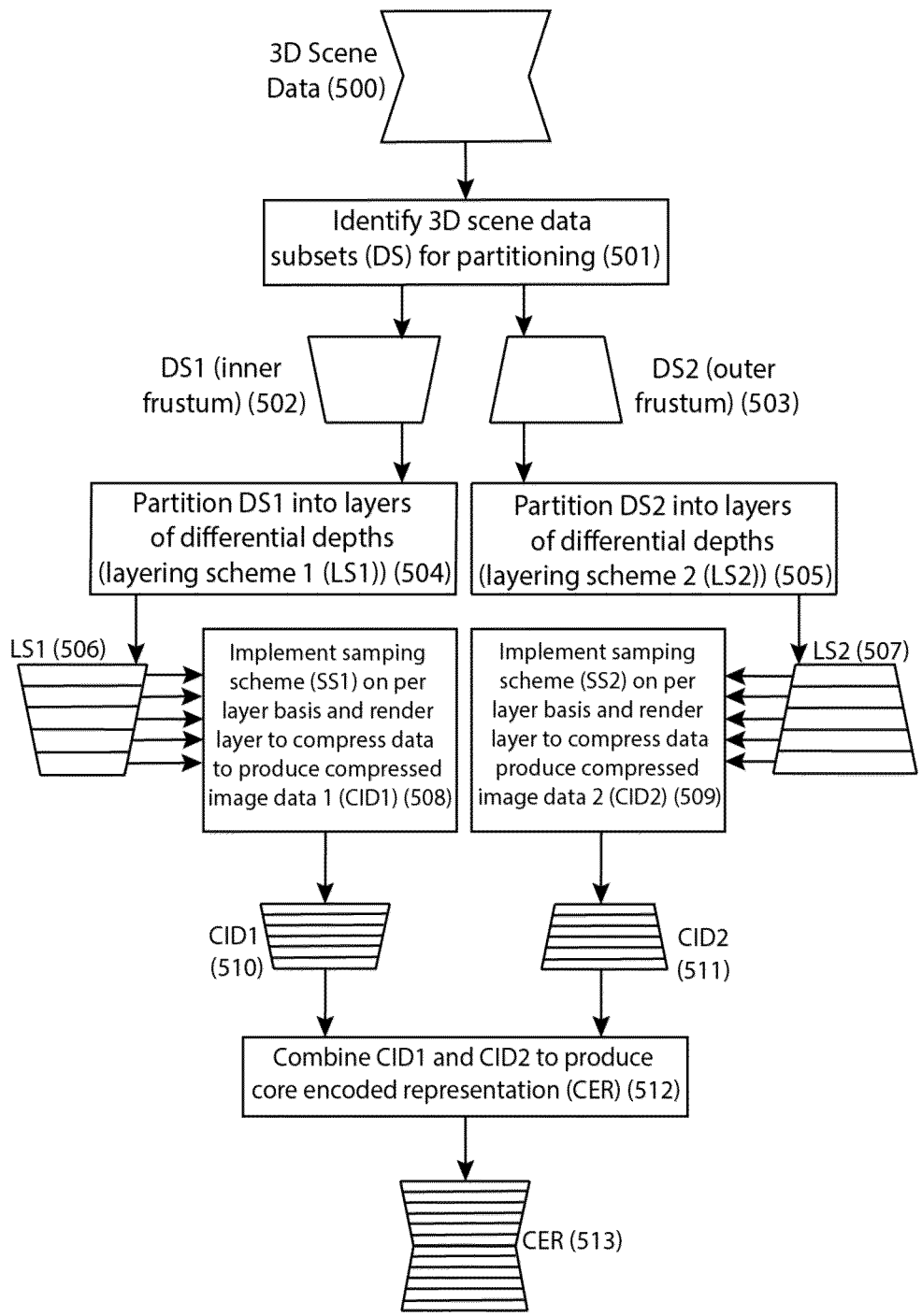
FIG. 11: illustrates an exemplary process flow for encoding 3D image (scene) data to produce layered and compressed core encoded (light field) representations, according to the present disclosure.

FIG. 11 illustrates an embodiment related to the embodiment shown in FIG. 10 in that two data (sub)sets; the inner frustum layer (502), and the outer frustum layer (503), that are derived based on the 3D scene data (500) are identified for partitioning (501) and the partitioning of each data set into layers of differential depths is implemented according to two different layering schemes for each data set (504, 505), i.e. equivalent to a plurality of data layers. Each set (plurality) of data layers (506, 507) representing an inner frustum and outer frustum volume of a light field display respectively are subsequently sampled on a per layer basis according to sampling scheme (508, 509); and each sampled layer is rendered to compress the data and produce two sets of compressed (image) data (510, 511) in process steps (508, 509), respectively. The sets of compressed data (510, 511) encoding the sets of light fields corresponding to the sets of data layers (506, 507), are then combined (512) to produce a layered, core encoded representation (513) (CER) of a final (display) light field.

Figure 12:
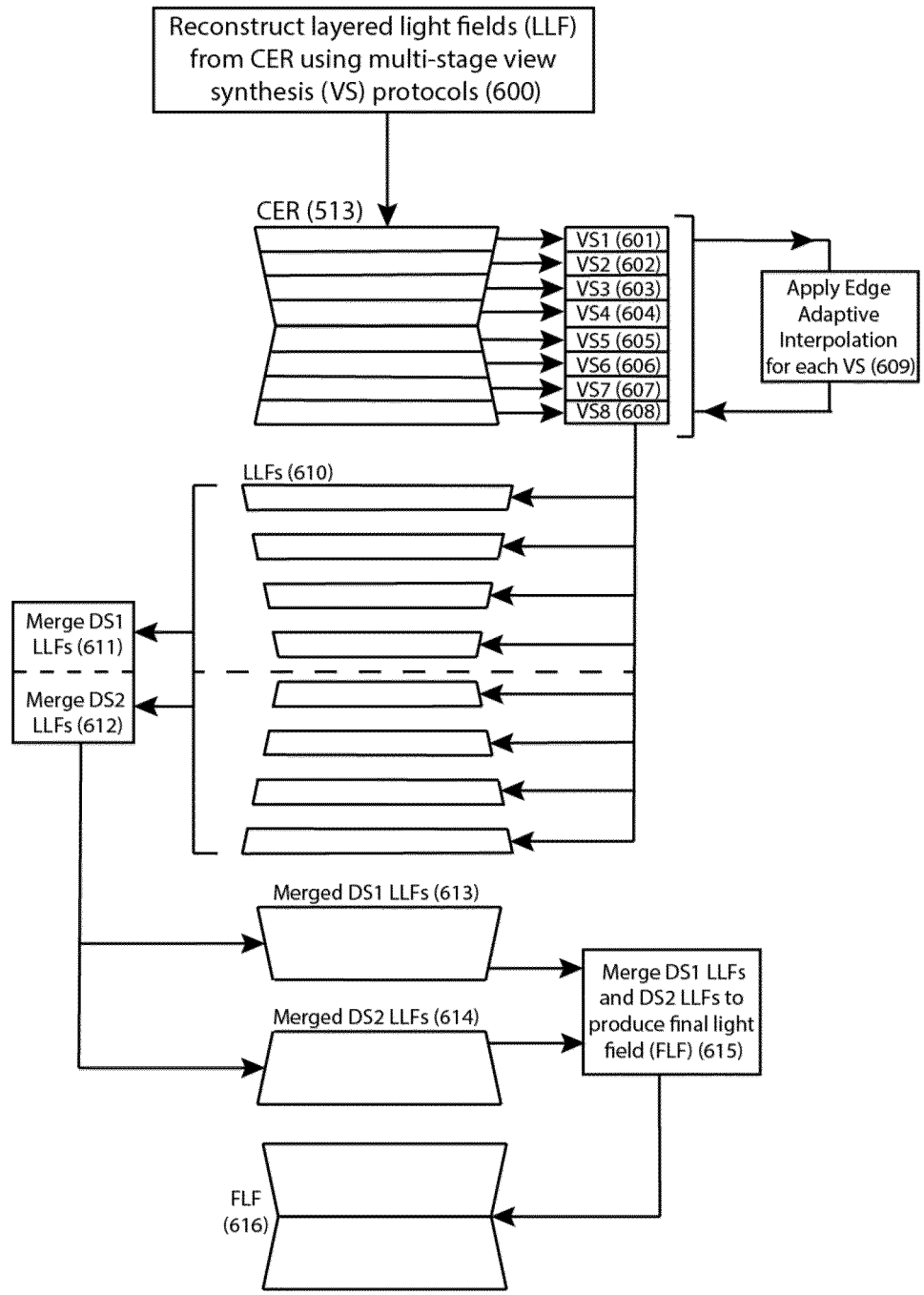
FIG. 12: illustrates an exemplary process flow for decoding core encoded representations to construct a (display) light field at a display, according to the present disclosure.

FIG. 12 illustrates an embodiment of a CODEC method or process to reconstruct a set of light fields and produce a final light field at a display. The set of light fields (layered light fields) is (re)constructed from the core encoded representation (513) using multi-stage view synthesis protocols (600). A protocol (designated as VS1-VS8) is applied (601-608) to each of the eight layers of the core encoded representation (513), which protocols may or may not be different depending on characteristics of each data layer light field to be decoded. Each protocol may apply a form of non-linear interpolation termed herein as edge adaptive interpolation (609) to provide good image resolution and sharpness in the set(s) of layered light fields (610) reconstructed from the core encoded representation of said fields ensure image sharpness. The layered light fields (610) are merged, in this case illustrating the merging of two sets of light fields (611, 612) corresponding to two data subsets to produce two sets of merged light fields (613, 614). The merged sets of light fields (613, 614) may represent, for example, the inner frustrum and outer frustum volumes of a final light field and can be accordingly merged (615) to produce said final light field (616) at a display.

CODEC Encoder/Encoding

Encoding according to the present disclosure is designed to support the generation of real-time interactive content (for example, for gaming or simulation environments) as well as existing multi-dimensional datasets captured through light field generalized pinhole cameras or camera arrays.

For a light field display D, a layered scene decomposition L, and a sampling scheme S, the system encoder produces the elemental images associated with the light fields corresponding to each layered scene decomposition layer included in the sampling scheme. Each elemental image corresponds to a generalized pinhole camera. The elemental images are sampled at the resolution specified by the sampling scheme and each elemental image includes a depth map.

Achieving rendering performance to drive real-time interactive content to multi-dimensional display with a significantly high resolution and size presented significant challenges overcome with the application of a hybrid or combination rendering approach to resolve the deficiencies of relying solely on any one technique as described herein.

When given identity function $\alpha$, the set of generalized pinhole cameras specified by the encoding scheme for a given layered scene decomposition layer can be systematically rendered using standard graphics viewport rendering. This rendering method results in a high number of draw calls, particularly for layered scene decomposition layers with sampling schemes including large numbers of the underlying elemental images. Therefore, in a system utilizing layered scene decomposition for realistic, autostereoscopic light field displays, this rendering method alone does not provide real-time performance.

A rendering technique utilizing standard graphics draw calls restricts the rendering of a generalized pinhole camera's planar parameterizations (identity function $\alpha$) to perspective transformations. Hardware-optimized rasterization functions provide the performance required for high-quality real-time rendering in traditional two-dimensional displays. These accelerated hardware functions are based on planar parameterizations. Alternatively, parallel oblique projections can utilize standard rasterized graphics pipelines to render generalized pinhole camera planar parameterizations.

The present disclosure contemplates the application of rasterization to render the generalized pinhole camera views by converting sets of triangles into pixels on the display surface. When rendering large numbers of views, every triangle must be rasterized in every view; oblique rendering reduces the number of rendering passes required for each layered scene decomposition layer and can accommodate any arbitrary identity function $\alpha$. The system utilizes one parallel oblique projection per angle specified by the identity function $\alpha$. Once the data is rendered, the system executes a "slice and dice" block transform (see U.S. Pat. Nos. 6,549,308 and 7,436,537) to re-group the stored data from its by-angle grouping into an elemental image grouping. The "slice and dice" method alone is inefficient for real-time interactive content requiring many separate oblique rendering draw calls when a large number of angles are to be rendered.

An arbitrary identity function $\alpha$ can also be accommodated by a ray-tracing rendering system. In ray tracing, specifying arbitrary angles does not require higher performance than accepting planar parameterizations. However, for real-time interactive content requiring rendering systems utilizing the latest accelerated GPUs, rasterization provides more reliable performance scalability than ray tracing rendering systems.

The present disclosure provides several hybrid rendering approaches to efficiently encode a light field. In one embodiment, encoding schemes render layered scene decomposition layers located closer to the display surface, with more images requiring less angular samples, and layers located further away from the display surface, with less images and more angular samples. In a related embodiment, perspective rendering, oblique rendering, and ray tracing are combined to render layered scene decomposition layers; these rendering techniques can be implemented in a variety of interleaved rendering methods.

According to the generalized, illustrative embodiment of the disclosure, one or more light fields are encoded by a GPU rendering an array of two-dimensional pinhole cameras. The rendered representation is created by computing the pixels from the sampling scheme applied to each of the layered scene decomposition layers. A pixel shader performs the encoding algorithm. Typical GPUs are optimized to produce a maximum of 2 to 4 pinhole camera views per scene in one transmission frame. The present disclosure requires rendering hundreds or thousands of pinhole camera views simultaneously, thus multiple rendering techniques are employed to render data more efficiently.

In one optimized approach, the generalized pinhole cameras in the layered scene decomposition layers located further away from the display surface are rendered using standard graphics pipeline viewport operations, known as perspective rendering. The generalized pinhole cameras in the layered scene decomposition layers located closer to the display surface are rendered using the "slice and dice" block transform. Combining these methods provides high efficiency rendering for layered plenoptic sampling theory sampling schemes. The present disclosure provides layered scene decomposition layers wherein layers located further away from the display surface contain a smaller number of elemental images with a higher resolution and layers located closer to the display surface contain a greater number of elemental images with a lower resolution. Rendering the smaller number of elemental images in the layers further away from the display surface with perspective rendering is efficient, as the method requires only a single draw call for each elemental image. However, at some point, perspective rendering becomes or is inefficient for layers located closer to the display surface, as these layers contain a greater number of elemental images, requiring an increased number of draw calls. Since elemental images located in layers located closer to the display surface correspond to a relatively small number of angles, oblique rendering can efficiently render these elemental images with a reduced number of draw calls. In one embodiment a process to determine where the system should utilize perspective rendering, oblique rendering, or ray tracing to render the layered scene decomposition layers is provided. Applying a threshold algorithm, each layered scene decomposition layer is evaluated to compare the number of elemental images to be rendered (i.e., the number of perspective rendering draw calls) to the size of the elemental images required at the particular layer depth (i.e., the number of oblique rendering draw calls), and the system implements the rendering method (technique) requiring the least number of rendering draw calls.

Where standard graphics calls cannot be utilized, the system can implement ray tracing instead of perspective or oblique rendering. Accordingly, in another embodiment, an alternative rendering method renders layers located closer to the display surface, or a portion of the layers located closer to the display surface, using ray tracing.

In ray-tracing rendering systems, each pixel in a layered scene decomposition layer is associated with a light ray defined by the light field. Each ray is cast and the intersection with the layered scene decomposition is computed as per standard ray tracing methodologies. Ray tracing is advantageous when rendering an identity function $\alpha$ which does not adhere to the standard planar parameterizations expected by the standard GPU rendering pipeline, as ray tracing can accommodate the arbitrary ray angles that are challenging for traditional GPU rendering.

When a hogel projects pixel into space not every pixel will be useful. Consider the top left hogel of a display projecting a pixel up and to the left. The only time this pixel would be seen by an observer would be if the observer was in a location where the top left hogel is at the bottom right boundary of the observer's field of view. From this location, every other hogel in the display would be viewed from a larger angle than the field of view allows for and as a result every other hogel would be turned off except the top left hogel. This observer location as specified is not in a useful viewing location and if the top left pixel of the top left hogel were turned off it would be inconsequential. This discussion uses the concept of a valid viewing zone. The valid viewing zone is a set of all locations in space where an observer can view every hogel on the display at an angle within the field of view and as a result receives a pixel from each hogel. This zone will be where the projection frustum of every hogel intersects.

The definition of the valid viewing zone can be effectively slimmed down to where the projection frustum of the four corner hogels intersect. The corners are the most extreme cases so if a location is within the projection frustum of the four corners the location is also within the valid viewing zone. This approach also introduces the concept of a maximum viewing distance which is the constraint introduced in order to realize these savings and efficiencies. Without the maximum viewing distance, the viewing frustum is a rectangular pyramid whose tip is oriented along the negative display normal and whose base is at an infinite depth from the display (i.e. a standard frustum). Introducing a maximum viewing distance, the base of the rectangular pyramid now has a base whose distance is the same as the maximum viewing distance. The approach taken to realize savings is not rendering or sending pixels that will not be projected into the valid viewing zone and are therefore wasteful. The number of pixels that are needed for a specified maximum viewing distance is the hogel fill factor. The hogel fill factor is the ratio between the viewing zone size and the hogel projection size at a given depth (i.e. in 2D, if the hogel projection has a width of 1 m and the viewing zone has a width of 0.5 m than only half the projected pixels were needed).

DW represents the display width in meters, MVD is the minimum view distance (in meters) FOV is the field of view (in degrees). The maximum viewing distance is defined as MVD+y, where y represents the size of usable range in meters. From similar geometry, angle b is equal to angle a, where angle b is equal to the field of view (in degrees). The width of the viewing zone, labeled c, is defined by the equation:

$$c = \tan\left(\frac{FOV}{2}\right) * 2 * y$$

The width of the hogel projection is defined by the equation:

$$e = \tan\left(\frac{FOV}{2}\right) * 2 * (y + MVD)$$

The hogel fill factor in 2D is the ratio between c and e, therefore:

$$\text{hogel fill factor} = \frac{\tan\left(\frac{FOV}{2}\right) * 2 * y}{\tan\left(\frac{FOV}{2}\right) * 2 * (y + MVD)}$$

Which reduces to:

$$\text{hogel fill factor} = \frac{y}{(y + MVD)}$$

If this is applied in 3D, then the hogel fill factor is applied along both (x,y). As a result, the hogel fill factor is defined as:

$$\text{hogel fill factor} = \left(\frac{y}{y + MVD}\right)^2$$

The result of increasing or decreasing the hogel fill factor is an increase or decrease in maximum viewing depth respectively.

Ray Trace Pixels in Corrected Sample Pattern

A strategy to produce a corrected light field is to rasterize a light field and then apply a per pixel warp operation. Where the pixel is supposed to go is determined by a characterization routine that involves imaging the display. How a light field is warped depends on an equation whose form does not change but has coefficients that do change. These coefficients are unique to each display. The idea behind the correction (but not literally how it works) is that if pixel was supposed to be at X but instead was measured at X+0.1 the pixel would be warped to location X−0.1 in anticipation that it will be measured at X. The goal is to have the measured location match the intended location.

This strategy of generation on a uniform grid followed by warping to the correct grid could be replaced with sampling the correct grid immediately using ray tracing. Rasterization is a uniform grid operation while ray tracing is generalized sampling. This would also help maintain the light field integrity. Consider a white pixel in a sea of black. The correction for a first lens system calls for both a horizontal and vertical shift of +0.5. The result is 4 gray pixels in a 2×2 grid surrounding 0.5,0.5. The display lens calls for both a horizontal and vertical shift of −0.5. The result is a 3×3 grid of illuminated pixels, a bright gray pixel in the center, four dimmer gray pixels on the four sides, and four dimmer gray pixels on the four corners. This dispersion of energy wouldn't happen if the pixels were originally sampled correctly. It seems unlikely that ray tracing will be faster than rasterization but the entire pipeline might be quicker if correction was cut out and only half the light field was capture as per the calculated hogel fill factor.

Screen Space Ray Tracing

An alternative to the warping approach to view synthesis is screen space ray tracing. McGuire et al. propose application of screen space ray tracing to multiple depth layers (for robustness). These depth layers are those that are produced by depth peeling. However, the depth peeling algorithm is slow, therefore when using modern GPUs, single-pass methods are preferred, e.g., Mara et al., based around reverse reprojection, multiple viewport, and multiple rasterization.

There is potential to combine screen space ray tracing with layered scene decomposition. Individual rays are traced based on the views that are known. From this, the result is an image indicating the color at each pixel. For a layered scene decomposition CODEC process, an encoded form of a light field is created and represented as layers with missing pixels. These pixels can be reconstructed using screen space ray tracing from the pixels present in the encoded representation. This representation can be elemental images or layered elemental images in the form of a deep G-buffer for example. In McGuire et al. it is described one technique for doing this, using an acceleration data structure for the layered depth image type representation. This stands in contrast to methods that trace rays at polygonal or object level representations which also are used effectively with data structures that accelerate ray intersection.

Many real-time rendering techniques operate in screen-space in order to be computationally efficient, including techniques for approximating realistic lighting, such as, but not limited to, screen-space ambient occlusion, soft shadows, and camera effects such as depth of field. These screen-space techniques are approximate algorithms that traditionally work by ray tracing 3D geometry. Many of these algorithms use screen-space ray tracing, or rather ray marching as described by Sousa et al. Ray marching is desirable as no additional data structure needs to be built. Classic ray marching methods, like Digital Differential Analyzer (DDA), are susceptible to over and under-sampling, unless perspective is accounted for. Most screen-space ray tracing methods use only a single depth layer. Combination of this technique with the layered scene decomposition allows the algorithms to work on a subset of the scene, rather than through multiple depth layers, and due to the optimized partitioning of the scene into subsets, ray hit distance may be reduced.

The skilled technician in the field to which the invention pertains will appreciate that there are multiple rendering methods and combinations of rendering methods that can successfully encode the layered scene decomposition elemental images. Other rendering methods may provide efficiency in different contexts, dependent upon the system's underlying computational architecture, the utilized sampling scheme, and the identity function α of the light field display.

CODEC Decoder/Decoding

Decoding according to the present disclosure is designed to exploit the encoding strategy (sampling and rendering). The core representation as a set of layered light fields from a downsampled layered scene decomposition is decoded to reconstruct the light fields $LF^O$ and $LF^P$. Consider a display $D=(M_x, M_y, N_u, N_v, f, \alpha, D_{LP})$ with a layered scene decomposition $L=(K_1, K_2, L^O, L^P)$ and an associated sampling scheme $S=(M_S, R)$. The elemental images are decoded by reconstructing the light fields $LF^O$ and $LF^P$ from deconstructed $LF^O$ and $LF^P$ light fields downsampled as specified by sampling scheme S. The pixels align such that the inner and outer frustum volume layers located closer to the display surface are reviewed first, moving to inner and outer frustum volume layers located further away from the display surface until a non-empty pixel is located, and the data from the non-empty pixel is transmitted to the empty pixel closer to the display surface. In an alternative embodiment, particular implementations may restrict viewing to the inner frustum volume or the outer frustum volume of the light field display, thereby requiring the decoding of one of $LF^O$ or $LF^P$.

In one embodiment, a decoding process is represented by the following pseudocode:
Core Layered Decoding:
for each $l_i \in L^O$:
ReconLF($LF_{l_i}$, $D_m[LF_{l_i}]$, S)
$LF^O = LF_{l_i} *m\ LF_{l_{i-1}}$ //or $LF_{l_i} *m\ LF_{l_{i+1}}$ (front-back vs. back-front)

A similar procedure reconstructs $LF^P$. Each layered scene decomposition layer is reconstructed from the limited samples defined by the given sampling scheme S. Each of the inner frustum volume layers or the outer frustum volume layers are merged to reproduce $LF^O$ or $LF^P$.

ReconLF can be executed in various forms with varying computational and post-CODEC image quality properties. ReconLF may be defined as a function, such that, given a light field associated with a layer that has been sampling according to given sampling scheme S, and the corresponding depth map for the light field, it reconstructs the full light field that has been sampled. The ReconLF input is the subset of $LF_{l_i}$ data defined by the given sampling scheme S and the corresponding downsampled depth map $D_m[LF_{l_i}]$. Depth-Image Based Rendering (DIBR), as described by Graziosi et al., can reconstruct the input light field. DIBR can be classified as a projection rendering method. In contrast to re-projection techniques, ray-casting methods, such as the screen space ray casting taught by Widmer et al., can reconstruct the light fields. Ray casting enables greater flexibility than re-projection but increases computational resource requirements.

In the DIBR approach, elemental images specified in the sampling scheme S are used as reference "views'" to synthesize the missing elemental images from the light field. As described by Vincent Jantet in "Layered Depth Images for Multi-View Coding" and by Graziosi et al., when the system uses DIBR reconstruction, the process typically includes forward warping, merging, and back projection.

Application of the back-projection technique avoids producing cracks and sampling artifacts in synthesized views such as elemental images. Back-projection assumes that the elemental image's depth map or disparity map is synthesized along with the necessary reference images required to reconstruct the target image; such synthesis usually occurs through a forward warping process. With the disparity value for each pixel in the target image, the system warps the pixel to a corresponding location in a reference image; typically, this reference image location is not aligned on the integer pixel grid, so a value from the neighboring pixel values must be interpolated. Implementations of back projection known in the art use simple linear interpolation. Linear interpolation, however, can be problematic. If the warped reference image location sits on or near an object edge boundary, the interpolated value can exhibit significant artifacts, as information from across the edge boundary is included in the interpolation operation. The synthesized image is generated with a "smeared'" or blurred edge.

The present disclosure provides a back-projection technique for the interpolation substep, producing a high-quality synthesized image without smeared or blurred edges. The present disclosure introduces edge-adaptive interpolation (EAI), where the system incorporates depth map information to identify the pixels required by the interpolation operation to calculate the colour of the warped pixels in a reference image. EAI is a nonlinear interpolation procedure that adapts and preserves edges during low-pass filtering operations. Consider a display $D=(M_x, M_y, N_{u, v}, f, \alpha, D_{LP})$ with a target image $I_t(x, y)$, a reference image $I_r(x, y)$, and depth maps $D_m(I_t)$ and $D_m(I_r)$. The present disclosure utilizes the depth map $D_m(I_t)$ pinhole camera parameters (f, $\alpha$, etc.) and the relative position of the display's array of planar-parameterized pinhole projectors to warp each $I_t$ pixel integer (x, y,) to a real-number position $(x_w, y_w)$ in $I_r$. In the likely scenario where $(x_w, y_w)$ is not located on an integer coordinate position, a value must be reconstructed based on $I_r$ integer samples.

Linear interpolation methods known in the art reconstruct $I_r(x_w, y_w)$ from the four nearest integer coordinates located in a 2×2 pixel neighborhood. Alternate reconstruction methods use larger neighborhoods (such as 3×3 pixel neighborhoods), generating similar results with varying reconstruction quality (see Marschner et al., "An evaluation of reconstruction filters for volume rendering"). These linear interpolation methods have no knowledge of the underlying geometry of the signal. The smeared or blurred edge images occur when the reconstruction utilizes pixel neighbors belonging to different objects, separated by an edge in the images. The erroneous inclusion of colour from other objects creates ghosting artifacts. The present disclosure remedies this reconstruction issue by providing a method to weigh or omit pixel neighbors by using the depth map $D_m(I_r)$ to predict the existence of edges created when a plurality of objects overlap.

Figure 3A:
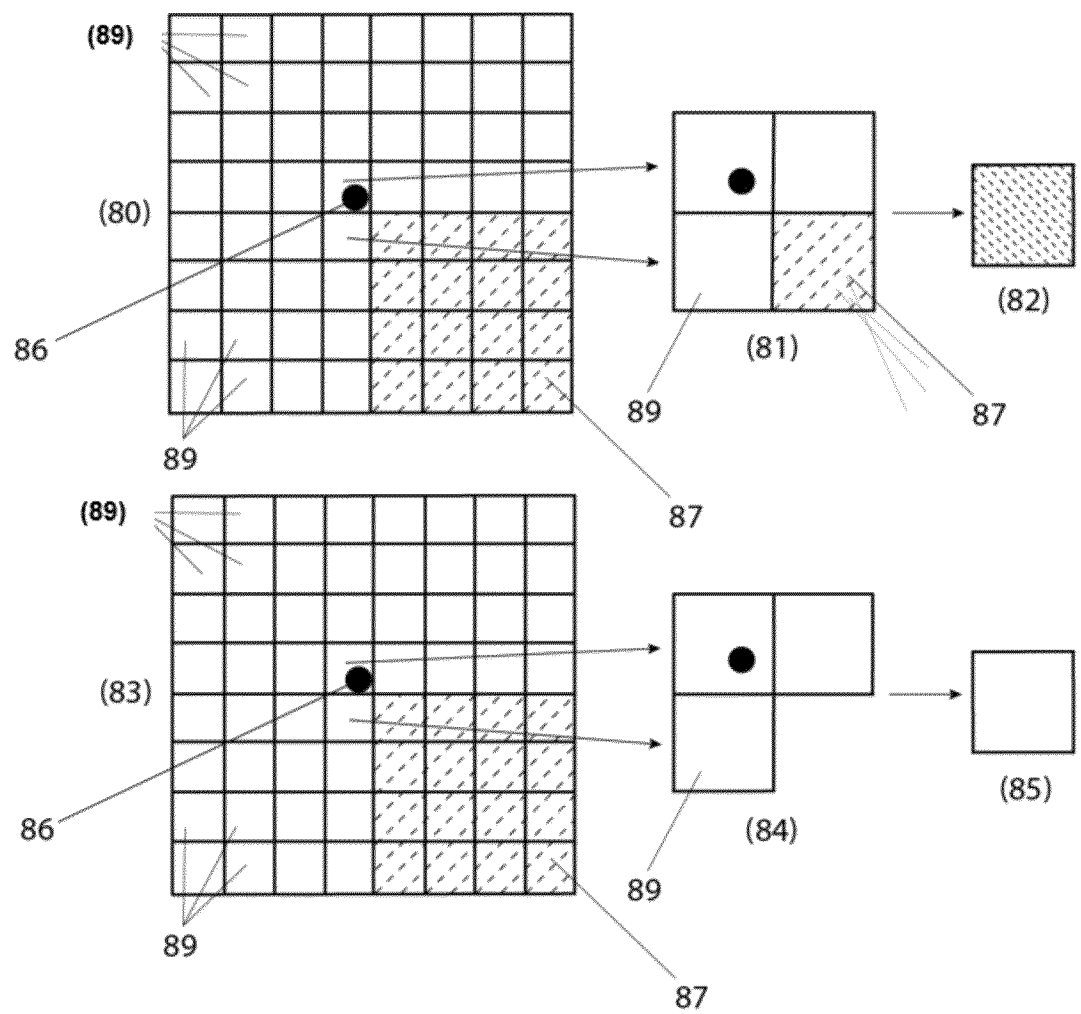
FIG. 3A: illustrates schematically the application of edge adaptive interpolation for pixel reconstruction according to the present disclosure.

FIG. 3A illustrates textures (80,83), where a sampling location, illustrated as a black dot (86), is back-projected into another image being reconstructed. The sampling location (86) is located near the boundary of a dark object (87) with a white background (88). In a first reconstruction matrix (81), the full 2×2 pixel neighborhood, each single white pixel represented by a square (89), reconstructs the sampling location (86) value using a known technique such as linear interpolation. This results in a non-white pixel (82), as the dark object (87) is included in the reconstruction. The second reconstruction matrix (84) uses the EAI technique of the present disclosure, reconstructing the sampling location (86) from the three neighboring single white pixels (90). EAI detects the object edge and omits the dark pixel (87), resulting in the correct white pixel reconstruction (85).

For a fixed, arbitrary coordinate $(x_r, y_r)$ in the target image $I_t(x, y)$, $d_t$ defines the location depth:

$$d_t = D_m[I_t(x_r, y_r)]$$

The target image coordinate $(x_r, y_r)$ warps to the reference image coordinate $(x_w, y_w)$.

For an m-sized neighborhood of points close to $(x_w, y_w)$, the set $N_S = \{(x_i, y_i) | 1 \leq i \leq m\}$. The weight for each of the neighbors is defined as:

$$w_i = f(d_t, D_m[I_r](x_i, y_i))$$

Where $w_i$ is a function of the depth $(x_r, y_r)$ and the depth of the neighbor of $(x_w, y_w)$ corresponding to index i. The following equation represents an effective $w_i$ for a given threshold $t_e$:

$$w_i = \begin{cases} 1 & |d_t - D_m[I_r](x_i, y_i)| < t_e \\ 0 & |d_t - D_m[I_r](x_i, y_i)| \geq t_e \end{cases}$$

The threshold $t_e$ is a feature size parameter. The weight function determines how to reconstruct $I_r(x_r, y_r)$:

$$I_r(x_r,y_r) = \text{Recon}(w_1 I_r(x_1,y_1),(w_2 I_r(x_2,y_2)), \ldots (w_m I_r(x_m, y_m)))$$

The Recon function can be a simple modified linear interpolation, where the $w_i$ weights are incorporated with standard weighting procedures and re-normalized to maintain a total weight of 1.

The present disclosure also provides a performance-optimized decoding method for reconstructing the layered scene decomposition. Consider a display $D=(M_x, M_y, N_u, N_v, f, a, D_{LF})$ with a layered scene decomposition $L=(K_1, K_2, L^O, L^P)$ and an associated sampling scheme $S=(M_S, R)$. The elemental images are decoded by reconstructing the light fields $LF^O$ and $LF^P$ from deconstructed $LF^O$ and $LF^P$ light fields downsampled as specified by sampling scheme S. As noted above, particular implementations may restrict viewing to the inner frustum volume or the outer frustum volume of the light field display, thereby requiring the decoding of one of $LF^O$ or $LF^P$.

$LF^O$ can be reconstructed by decoding the elemental images specified by sampling scheme S. The ReconLF method for particular layers does not include inherent constraints regarding the order that the missing pixels of the missing elemental images are to be reconstructed. It is an object of the present disclosure to reconstruct missing pixels using a method that maximizes throughput; a light field large enough for an effective light field display requires an exceptional amount of data throughput to provide content at an interactive frame rate, therefore improved reconstruction data transmission is required.

Figure 3B:
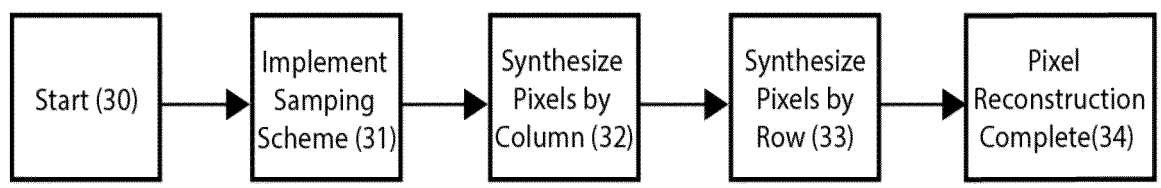
FIG. 3B: illustrates a process flow for reconstructing a pixel array.

FIG. 3B illustrates a general process flow for reconstructing a pixel array. Reconstruction starts (30), followed by implementing a sampling scheme (31). Pixels are then synthesized by column (32) in the array and also synthesized by row (33), which can be done in either order. Once the synthesis of all pixels has been done by column and row the pixel reconstruction is complete (34).

The present disclosure introduces a basic set of constraints to improve pixel reconstruction with improved data transmission for content at an interactive frame rate. Consider a single light field $L_i \varepsilon L_O$ containing $M_x \times M_y$ elemental images, as input to ReconLF. The pixels (in other words, the elemental images) are reconstructed in two basic passes. Each pass operates in separate dimensions of the array of elemental images; the system executes the first pass as a column decoding, and the second pass as a row decoding, to reconstruct each of the pixels. While the present disclosure describes a system employing column decoding followed by row decoding, this is not meant to limit the scope and spirit of the invention, as a system employing row decoding followed by column decoding can also be utilized.

Figure 4:
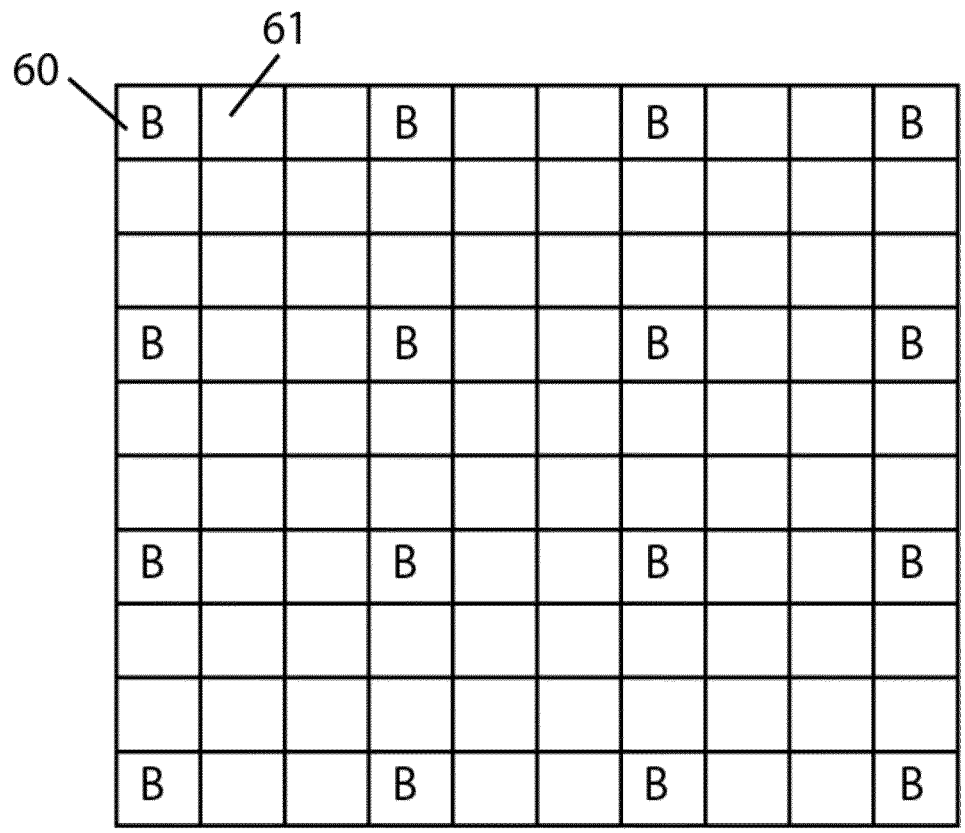
FIG. 4: illustrates schematically elemental images specified by a sampling scheme within a pixel matrix, as part of the image (pixel) reconstruction process according to the present disclosure.
Figure 5:
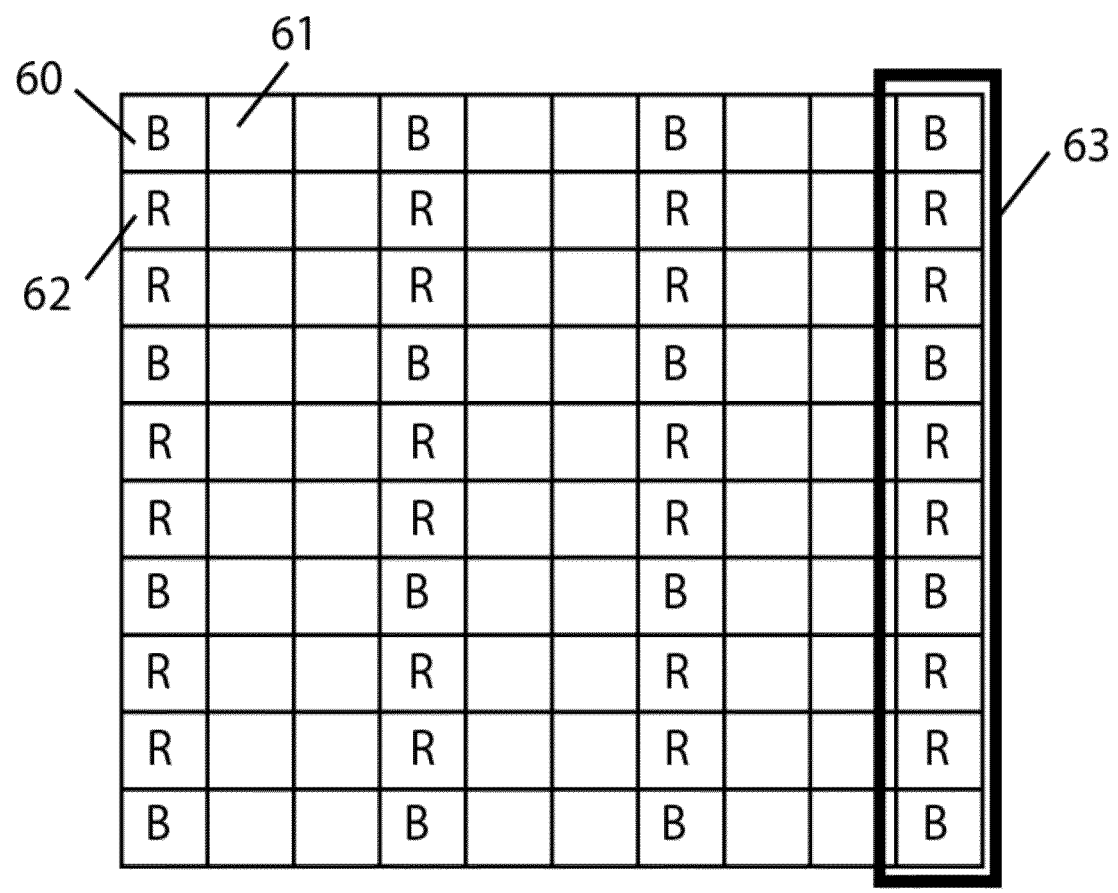
FIG. 5: illustrates schematically a column-wise reconstruction of a pixel matrix, as part of the image (pixel) reconstruction process according to the present disclosure.
Figure 6:
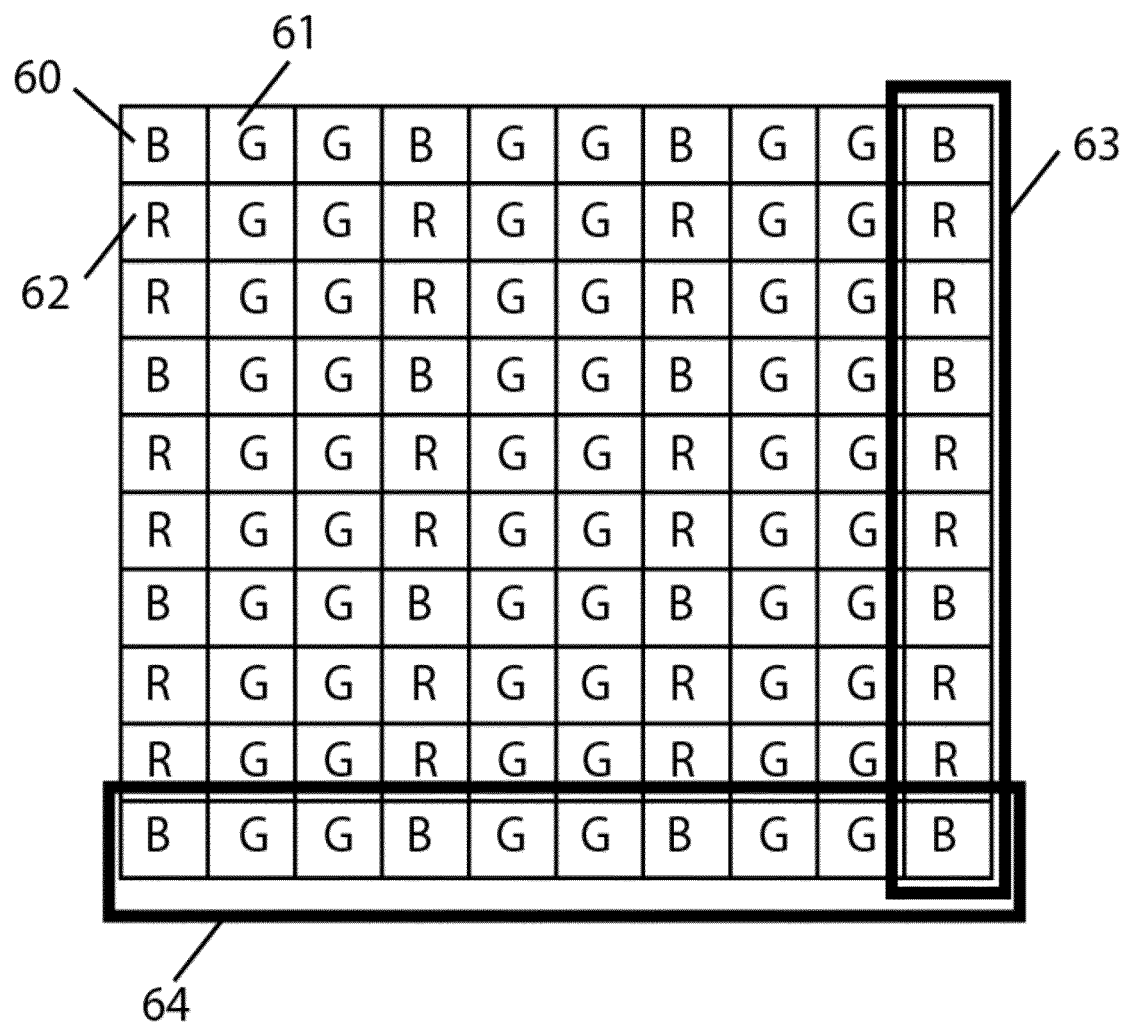
FIG. 6: illustrates a subsequent row-wise reconstruction of the pixel matrix, as part of the image (pixel) reconstruction process according to the present disclosure.

In the first pass, the elemental images specified by sampling scheme S are used as reference pixels to fill in missing pixels. FIG. 4 illustrates the elemental images in the matrix as B, or blue pixels (60). The missing pixels (61) are synthesized strictly from reference pixels in the same column. FIG. 5 illustrates schematically a column-wise reconstruction of a pixel matrix, as part of the image (pixel) reconstruction process showing column-wise reconstruction (63) of red pixels (62) and blue pixels (60). These newly synthesized column-wise pixels are shown as R, or red pixels (62) in FIG. 5 next to blue pixels (60) and missing pixels (61). Newly reconstructed pixels written to a buffer and act as further pixel references for the second pass, which reconstructs pixels reference pixels located in the same row as other elemental images. FIG. 6 illustrates a subsequent row-wise reconstruction (64) of the pixel matrix, as part of the image (pixel) reconstruction process alongside the column-wise reconstruction (63). These newly synthesized row-wise pixels are shown as G, or green pixels (65) next to blue pixels (60) and red pixels (62).

In one embodiment a process for reconstructing a pixel array is represented by the following pseudocode algorithm:

Dimensional Decomposition Light Field Reconstruction:
Pass 1:
for each row of elemental images in $L_i$
   for each missing elemental image in the row
     for each row in elemental image
       load (cache) pixels from same row in reference images
     for each pixel in missing row
       reconstruct pixel from reference information and write
Pass 2:
for each column of elemental images in $L_i$
   for each missing elemental image in the column
     for each column in elemental image
       load (cache) reference pixels from same column
     for each pixel in missing column
       reconstruct pixel from reference information and write This performance-optimized decoding method allows the row-decoding and column-decoding constraints to limit the effective working data set required for reconstruction operations.

To reconstruct a single row of a missing elemental image, the system only requires the corresponding row of pixels from the reference elemental images. Likewise, to reconstruct a single column of a missing elemental image, the system only requires the corresponding column of pixels from the reference elemental images. This method requires a smaller dataset, as decoding methods previously known in the art require entire elemental images for decoding.

Even when decoding relatively large elemental image sizes, the reduced dataset can be stored in a buffer while rows and columns of missing elemental images are being reconstructed, thereby providing improved data transmission.

Once all the rendered data has been decoded, and each of the plurality of inner and outer display volume layers are reconstructed, the layers are merged into a single inner display volume layer and a single outer display volume layer. The layered scene decomposition layers can be partially decompressed in a staged decompression or can be fully decompressed simultaneously. Algorithmically, the layered scene decomposition layers can be decompressed through a front-to-back or back-to-front process. The final double frustum merging process combines the inner and outer display volume layers to create the final light field for the light field display.

Use of Computational Neural Network with Layered Scene Decomposition

Martin discusses deep learning in light fields presenting that Convolutional Neural Networks (CNNs). Research on deep learning towards other light field problems is also ongoing as it is an increasingly popular approach is to train networks end to end, implying that the network learns all aspects of problem at hand. For example, in view synthesis, this avoids using computer vision techniques, such as appearance flow, image inpainting, and depth image-based rendering to model certain parts of the network. Martin presents the framework for a pipeline concept for view synthesis for light field volume rendering. This pipeline has the ability to be implemented with the layered scene decomposition method disclosed herein.

Layered scene decomposition achieves multi-dimensional scene decomposition into layers, or subsets and elemental images, or subsections. Machine learning is emerging as a learning-based method of view synthesis. A layered scene decomposition provides a method of downsampling of a light field following its decomposition into layers. Previously, this was considered in the context of opaque surface rendering with Lambertian shaded surfaces. What is desired is a method of downsampling light fields, as previous, but can be applied with higher-order lighting models, including semi semi-transparent surfaces, for example, direct volume rendering based lighting models. Volume rendering techniques include but are not limited to direct volume rendering (DVR), texture-based volume rendering, volumetric lighting, two-pass volume rendering with shadows, or procedural rendering.

Direct volume rendering is rendering process which: maps from a volume (e.g. voxel-bases sampling of a scalar field) data-set to a rendered image without intermediary geometry (no isosurface). Generally, the scalar field defined by the data is considered as a semi-transparent, light emitting medium. A transfer function specifies how the field is mapped to opacity and color and a ray-casting procedure then accumulates the local color, opacity along paths from a camera and through the volume.

Levoy (1988) first presented that direct volume rendering methods generate images of a 3D volumetric data set without explicitly extracting geometric surfaces from the data. Kniss et al. present that though a data set is interpreted as a continuous function in space, for practical purposes it is represented by a uniform 3D array of samples. In graphics memory, volume data is stored as a stack of 2D texture slices or as a single 3D texture object. The term voxel denotes an individual "volume element," similar to the terms pixel for "picture element" and texel for "texture element." Each voxel corresponds to a location in data space and has one or more data values associated with it. Values at intermediate locations are obtained by interpolating data at neighboring volume elements. This process is known as reconstruction and plays an important role in volume rendering and processing applications.

The role of an optical model is to describe how light interacts with particles within the volume. More complex models account for light scattering effects by considering illumination (local) and and volumetric shadows. Optical parameters are specified by the data values directly, or they are computed from applying one or more transfer functions to the data to classify particular features in the data.

Martin implements volume rendering using volume data sets and provides a depth buffer to assign a depth value for each individual pixel location. The depth buffer, or z-buffer is converted to a pixel disparity and the depth buffer value, $Z_b Z_b$, is converted into normalized coordinates in the range $[-1, 1]$, as $Z_c Z_c = 2 \cdot Z_b Z_b - 1$. Then the perspective projection is inverted to give depth in eye space, $Z_e$, as:

$$Z_e = \frac{2 \cdot Z_n \cdot Z_f}{Z_n + Z_f - Z_c(Z_f - Z_n)}$$

Where $Z_n$ is the depth of the camera's near plane and $Z_f$ is the depth of the far plane in eye space. Wanner et al. presents that $Z_n$ should be set as high as possible to improve depth buffer accuracy, while $Z_f$ has little effect on the accuracy. Given eye depth $Z_e$, it can be converted to a disparity value dr in real units by the use of similar triangles as:

$$dr = \frac{B \cdot f}{Z_e} - \Delta x$$

Where B is the distance between two neighbouring cameras in the grid, f is the focal length of the camera, and $\Delta x$ is the distance between two neighbouring cameras' principle points. Using similar triangles, the disparity in real units can be converted to a disparity in pixels as:

$$dp = \frac{dr Wp}{Wr}$$

Where dp and dr denote the disparity in pixels and real-world units respectively, Wp is the image width in pixels, and Wr is the image sensor width in real units. If the image sensor width in real units is unknown, Wr can be computed from the camera field of view $\theta$ and focal length f as:

$$Wr = 2 \cdot f \tan\left(\frac{\theta}{2}\right)$$

View synthesis may also be formulated through warping. While warping is a simple method to synthesize new views, it can produce visual artifacts that can degrade the visual quality of the warped image. The most common of these artifacts are disocclusions, cracks and ghosting.

Disocclusion artifacts or "occlusion holes" occur when a foreground object is warped and the reference views do not contain the data for the background pixels that are now in view. Occlusion holes can be fixed by inpainting the hole with available background information or filling the hole with actual data captured by extra references or residue information.

Warp cracks occur when warping a surface and two pixels that are adjacent in the reference view are warped to the new view and are now longer adjacent but are separated by a small number of pixels. Rounding errors can cause warp cracks because the newly calculated pixel coordinates have to be truncated to integer image coordinates, which can cause an adjacent pixel to round differently. Sampling frequency can cause warp cracks by trying to warp a surface into an orientation that increases its pixel count, i.e. plane slanted to a camera and then viewed perpendicular. The new view will want to display pixels that were beyond the sampling frequency of the reference camera, leading to cracks in the new image.

Ghosting can occur during the backward warping interpolation phase. Here the back projected pixel neighborhood contains pixels from both a background and foreground object. Pixels from the foreground can bleed color information into the background which can cause a "halo" or ghosting effect. These usually occur around an occlusion holes and bleed foreground color into the background.

One of the main problems with forward warping is that the warped image can contain warp cracks which degrade the visual quality. Depth maps generated with forward warping can easily be fixed by merging multiple views warped from different references or by applying a crack filter. Filters, like a median filter, can effectively remove cracks because a depth map is a very low frequency image, containing mostly subtle gradients or edges around objects. These simple filters will not work on color images due to the complexity of the object textures. A method to remove warp cracks in the color image is to use backward warping. In backward warping, you first forward warp the depth image to get a depth map of the new view. After filtering the cracked depth map, you use the filtered depth to warp back to a reference image. To prevent cracks from occurring, you do not round the pixel coordinates, but instead select a pixel neighborhood and use the real pixel weighting to interpolate the correct color. This backward warped color image is now free of cracks. A side effect of the interpolation phase is the possibility to introduce ghosting artifacts.

Interactive direct volume rendering is required for interactive viewing of time-varying 4D volume data, as progressive rendering may not work well for that particular use case as presented by Martin. Example use cases for interactive direct volume rendering include but are not limited to the rendering of static voxel-based data without artifacts during rotation, rendering of time-varying voxel-based (e.g. 4D MRI or Ultrasound, CFD, wave, meteorological, visual effects (OpenVDB) and other physical simulations, etc.) data.

A proposed solution includes the use of machine learning to learn how to "warp" volumetric scene views, potentially constrained to a particular transfer function, which communicates how to map density of the different materials to color and then its level of transparency. For a fixed transfer function, a Computational Neural Network could be trained very well with a modest sized data set to allow a used to define a decoder that only works for volume data and only works for a particular transfer function. The potential results is a hardware system, or a decoding system, that when the desired transfer function is selected, it would change the decoder slightly from a different training data set in order to be able to decode the data has been given.

A proposed method disclosed herein is suited for the rendering of 4D volume data. Using current hardware and hardware techniques, it is very difficult to brute force render light fields of volume data. What is proposed is generating a layered scene decomposition of volume data which is to be rendered and decoded using a decoder. Decoding the data is effectively filling in missing pixels or elemental images. A convolutional neural network may be trained to solve smaller versions of the problem, using the system employing column decoding followed by row decoding, in addition, a system employing row decoding followed by column decoding may also be utilized. Martin teaches that in order to perform fast but accurate image warping using a disparity map, a form of backward warping with bilinear interpolation is to be implemented. The estimated disparity map for the central view is used as an estimate for all views. Pixels in the novel view that should read data from a location that falls outside the border of the reference view are set to read the closest border pixel in the reference view instead. Essentially, this stretches the border of the reference view in the novel view, rather than producing holes. Since warped pixels rarely fall at integer positions, bilinear interpolation is applied to accumulate information from the four nearest pixels in the reference view. This results in fast warping with no holes, and good accuracy. Martin further discloses a method of training a neural network to apply this correction function. An improvement on this is to teach a neural network compatible with layered scene decomposition. This could be further expanded to apply a convolutional neural network for each layer within a layered scene decomposition that was specifically trained for that layer, each depth. A neural network would then be set to perform row reconstruction while another neural network would be set to perform column reconstruction.

Based on the selected criteria, a light field display simulator could be used to train the neural network. A light field display simulator provides a high-performance method of exploring the parameterization of simulated virtual three-dimensional light field displays. This method uses a canonical image generation method as part of its computational process to simulate a virtual observer's view(s) of a simulated light field display. The canonical image method provides for a robust, fast and versatile method for generating a simulated light field display and the light field content displayed thereon.

To gain a better understanding of the invention described herein, the following examples are set forth with reference to the Figures. It will be understood that these examples are intended to describe illustrative embodiments of the invention and are not intended to limit the scope of the invention in any way.

EXAMPLES

Example 1: Exemplary Encoder and Encoding Method for a Light Field Display

The following illustrative embodiment of the invention is not intended to limit the scope of the invention as described and claimed herein, as the invention can successfully implement a plurality of system parameters. As described above, a conventional display as previously known in the art consists of spatial pixels substantially evenly-spaced and organized in a two-dimensional row, allowing for an idealized uniform sampling. By contrast, a three-dimensional (3D) display requires both spatial and angular samples. While the spatial sampling of a typical three-dimensional display remains uniform, the angular samples cannot necessarily be considered uniform in terms of the display's footprint in angular space.

In the illustrative embodiment, a plurality of light field planar-parameterized pinhole projectors provide angular samples, also known as directional components of the light field. The light field display is designed for a 640×480 spatial resolution and a 512×512 angular resolution. The plurality of planar-parameterized pinhole projectors are idealized with identity function $\alpha$. The pitch between each of the plurality of planar-parameterized pinhole projectors is 1 mm, thereby defining a 640 mm×400 mm display surface. The display has a 120° FOV, corresponding to an approximate focal length f=289 µm.

This light field display contains 640×480×512×512=80.5 billion RGB pixels. Each RGB pixel requires 8 bits, therefore one frame of the light field display requires 80.5 billion×8×3=1.93 Tb. For a light field display providing interactive content, data is driven at 30 frames/s, requiring a bandwidth of 1.93 Tb×30 frames/s=58.0 Tb/s. Current displays known in the art are driven by DisplayPort technology providing maximum bandwidths of 32.4 Gb/s, therefore such displays would require over 1024 DisplayPort cables to provide the tremendous bandwidth required by interactive light field displays, resulting in cost and form-factor design constraints.

The illustrative embodiment delivers data to a light field display from a computer equipped with an accelerated GPU with dual DisplayPort 1.3 cables output. We consider a conservative maximum throughput of 40 Gb/s. The encoded frames must be small enough for transmission over the DisplayPort connection to a decoding unit physically located closer to the light field display.

The layered scene decomposition of the illustrative embodiment is designed to allow the required data throughput. With the dimensions defined above, the maximum depth of field of the light field display is $Z_{DOF}$=(289 microns) (512)=147968 microns=147.986 mm. The layered scene decomposition places a plurality of layered scene decomposition layers within the depth of field region of the light field display, ensuring that the distance of the layered scene decomposition layers from the display surface is less than $Z_{DOF}$. This illustrative example describes a light field display with objects located only within the inner frustum volumes of the display. This illustrative example is not intended to limit the scope of the invention, as the invention can successfully implement a plurality of system parameters, such as a light field display with objects located only within the outer frustum volume of the display, or a light field display with objects located within both the inner and outer frustum volumes of the display; embodiments limited to one frustum volume require a smaller number of layered scene decomposition layers, thereby marginally decreasing the size of the encoded light field to be produced.

The illustrative embodiment defines ten layered scene decomposition layers. When necessary, additional layered scene decomposition layers can be added to capture data that could be lost to occlusions, or to increase the overall compression rate. However, additional layered scene decomposition layers require additional computation from the decoder, thus the number of layered scene decomposition layers is carefully chosen. The illustrative embodiment specifies the ten layered scene decomposition layers from their front and back boundaries and assumes that the dividing boundaries of the layer are parallel to the display surface.

Each layered scene decomposition layer is located at a defined distance from the display surface, where the distances are specified in terms of multiples of focal length f, up to the maximum depth of field of 512 f. Layered scene decomposition layers with a narrower width are concentrated closer to the display surface, and the layer width (i.e., the depth difference between the front and back layer boundaries) increases exponentially by powers of 2 as the distance from the display surface increases. This embodiment of the invention is not intended to limit the scope of the invention, as other layer configurations can be implemented successfully.

The following table (Table 1) describes the layered scene decomposition layer configurations of the illustrative embodiment, and provides a sampling scheme based on plenoptic sampling theory to create sub-sampled layered scene decomposition layers:

TABLE 1

| Layer | Front boundary | Back boundary | Elemental image resolution | Maximum distance between sampled elemental images (sampling gap) | Elemental images sampled | Total data size required (24 bit color, 8 bits for depth/disparity) |
|---|---|---|---|---|---|---|
| 0 | 1f | 1f | 1 × 1 | 0 | 640 × 480 | 7.37 Mbits |
| 1 | 1f | 2f | 2 × 2 | 1 | 321 × 241 | 9.90 Mbits |
| 2 | 2f | 4f | 4 × 4 | 2 | 214 × 161 | 17.64 Mbits |
| 3 | 4f | 8f | 8 × 8 | 4 | 161 × 97 | 31.98 Mbits |
| 4 | 8f | 16f | 16 × 16 | 8 | 72 × 55 | 32.44 Mbits |
| 5 | 16f | 32f | 32 × 32 | 16 | 41 × 31 | 41.65 Mbits |
| 6 | 32f | 64f | 64 × 64 | 32 | 21 × 16 | 44.04 Mbits |
| 7 | 64f | 128f | 128 × 128 | 64 | 11 × 9 | 51.90 Mbits |
| 8 | 128f | 256f | 256 × 256 | 128 | 6 × 5 | 62.91 Mbits |
| 9 | 256f | 512f | 512 × 512 | 256 | 4 × 3 | 100.66 Mbits |
| | | | | | Total: | 400.49 Mbits |

In the above table, layer 0 captures images that are to be displayed at the display surface, as in a conventional two-dimensional display known in the art. Layer 0 contains 640×480 pixels at a fixed depth, so it does not require any depth information. The total data size is calculated for each pixel with an RGB value and a depth value for 8 bits each (alternate embodiments may require larger bit values, such as 16 bits). In the illustrative embodiment, the elemental image resolution and sampling gap are calculated from the formulas described above, and the sampling scheme chosen reflects the elemental image resolution and sampling gap restrictions.

As described in the above table, the combined layered scene decomposition system has a total size of 400.5 Mb. Therefore, to produce data at a rate of 30 frames/s, a bandwidth of 30×0.4005=12.01 GB/s is required. This encoded form is sent over the dual DisplayPort 1.3 cables, along with additional information required to represent scene occlusions.

In the illustrative embodiment, the layered scene decomposition layers are configured by an encoder, efficiently implementing an oblique rendering technique to produce the layers located closer to the display surface (layers 0 to 5) and a perspective rendering technique to produce the layers located further away from the display surface (layers 6 to 9). Each elemental image corresponds to a single rendering view.

At layer 6, the number of separate angles to be rendered (64×64=4096) exceeds the number of views to be rendered (21×16=336); this signals the transition in efficiency between the oblique and perspective rendering methods. It should be noted that specific implementation aspects may provide additional overhead that skews the exact optimal transition point. For use with modern graphics acceleration techniques known in the art, perspective rendering can be efficiently implemented using geometry shader instancing. Multiple views are rendered from the same set of input scene geometry without repeatedly accessing the geometry through draw calls and without repeatedly accessing memory to retrieve the exact same data.

Figure 8:
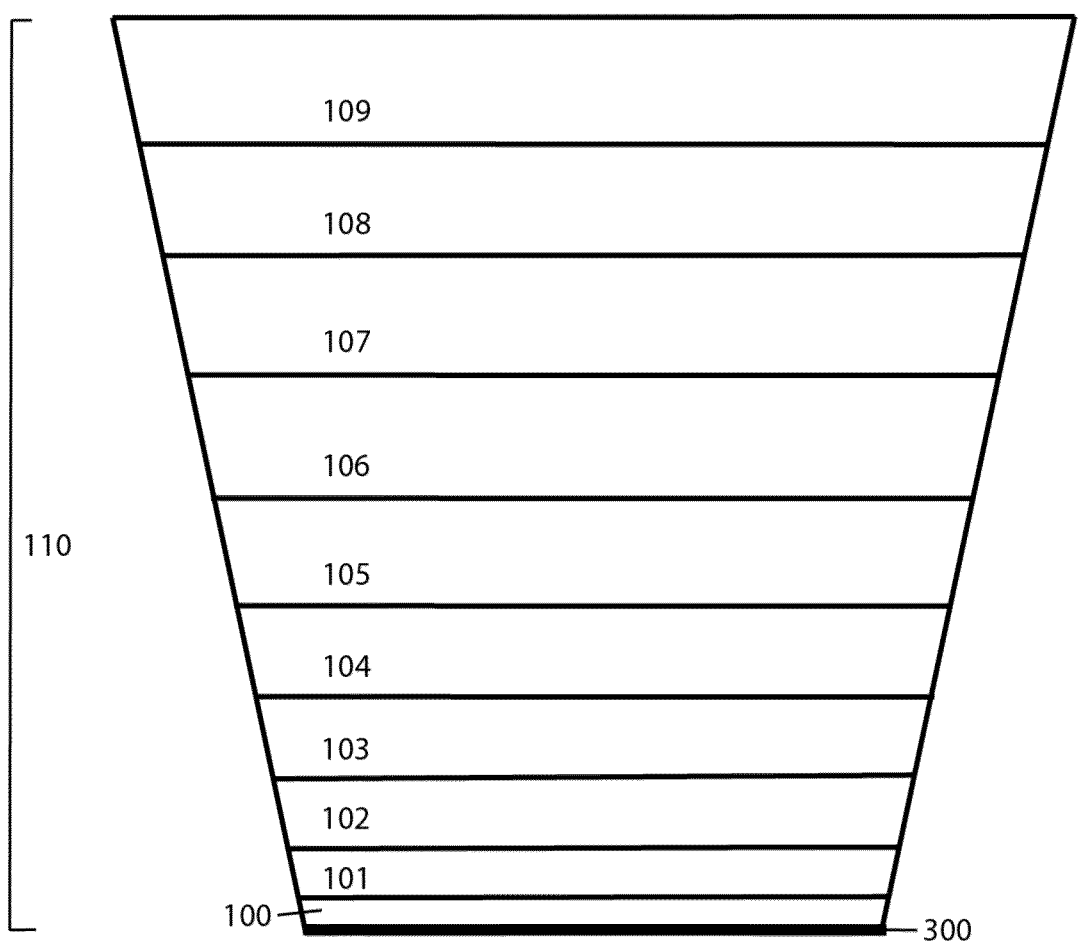
FIG. 8: illustrates schematically an exemplary layered scene decomposition of an image data set (a layering scheme of ten layers) correlating to the inner frustum light field of a display.

FIG. 8 illustrates the illustrative embodiment, with ten layered scene decomposition layers (100-109) in the inner frustum volume (110). The inner frustum volume layers extend from the display surface (300). The layers are defined as described in the table above, for example, the front boundaries of the inner frustum volume layer 0 (100) is 1 f, inner frustum volume layer 1 (101) is 1 f, inner frustum volume layer 2 (102) is 2 f, inner frustum volume layer 3 (103) is 4 f, and so on. Inner frustum volume layers (100-105) 0 to 5, or layers closest to the display surface (300), are rendered with the oblique rendering technique, and inner frustum volume layers (106-109), 6 to 9 furthest from the display surface are rendered with the perspective rendering technique.

Figure 9:
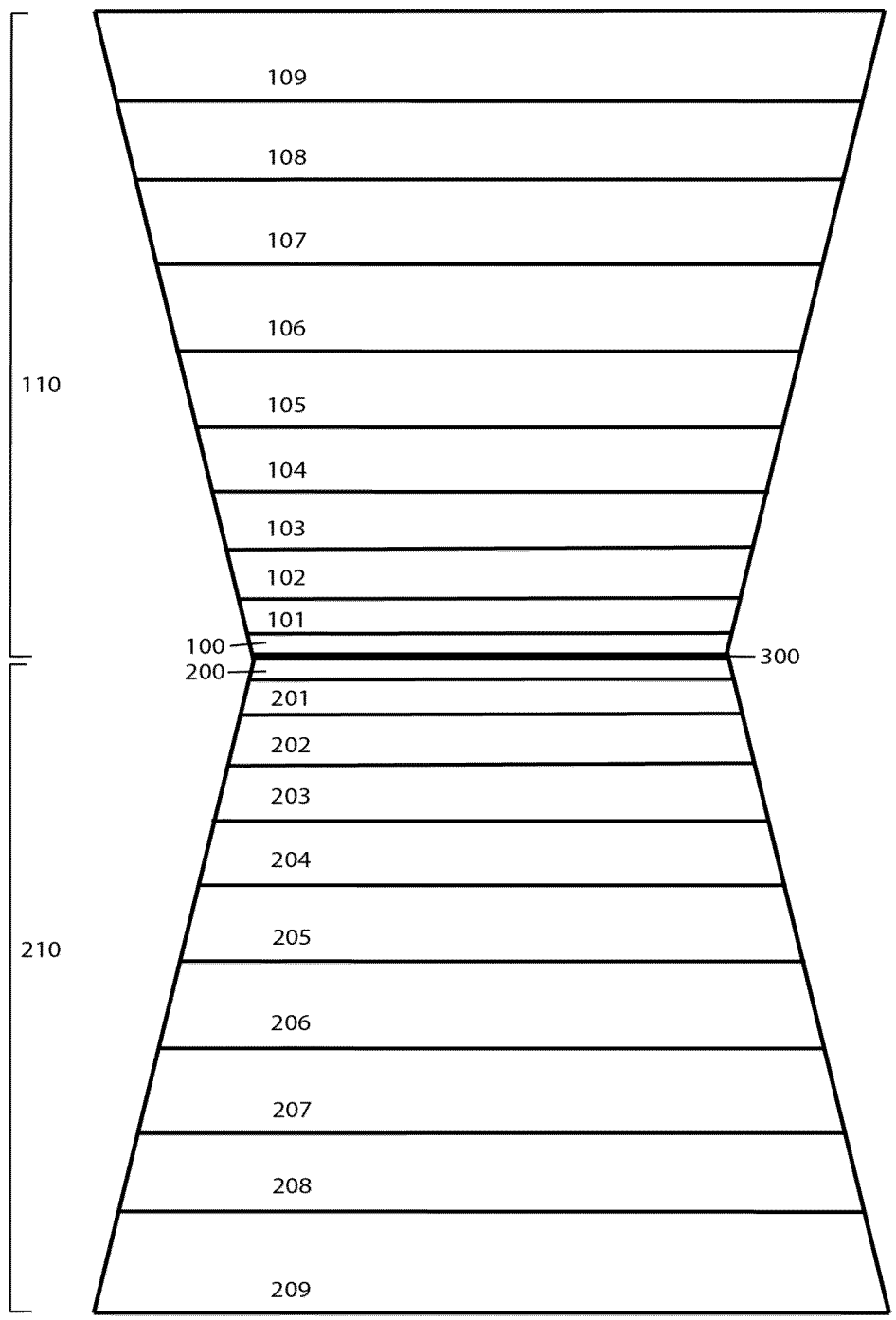
FIG. 9: illustrates schematically an exemplary layered scene decomposition of image data (two layering schemes of ten layers) correlating to the inner frustum and outer frustum light field regions, respectively, of a display.

FIG. 9 illustrates an alternate embodiment, with ten layered scene decomposition layers (100-109) in the inner frustum volume (110) and ten layered scene decomposition layers (200-209) in the outer frustum volume (210). The inner and outer frustum volume layers extend from the display surface (300). While the inner and outer frustum volume layers are illustrated as mirror images from each other, the inner and outer frustum volume may have differing numbers of layers, layers of different sizes, or layers of different depths. Inner frustum volume layers 0 to 5 (100-105) and outer frustum volume layers 0 to 5 (200-205) are rendered with the oblique rendering technique, and inner frustum volume layers 6 to 9 (106-109) and outer frustum volume layers 6 to 9 (206-209) farther from the display surface (300) are rendered with the perspective rendering technique.

An alternate embodiment can implement the system with a ray-tracing encoding based approach. Rendering a complete layered scene decomposition layer representation can require increased GPU performance, even with the optimizations described herein, as GPUs are optimized for interactive graphics on conventional two-dimensional displays where accelerated rendering of single views is desirable. The computational cost of the ray-tracing approach is a direct function of the number of pixels the system is to render. While the layered scene decomposition layer system contains a comparable number of pixels to some two-dimensional single view systems, the form and arrangement of said pixels differs greatly due to layer decomposition and corresponding sampling schemes. Therefore, there may be implementations where tracing some or all of the rays is a more efficient implementation.

Example 2: CODEC Decoder and Decoding Method for a Light Field Display

In the illustrative embodiment of the invention, the decoder receives the 12.01 GB/s of encoded core representation data, plus any residue representation data, from the GPU over dual DisplayPort 1.3 cables. The compressed core representation data is decoded using a customized FPGA, ASIC, or other integrated circuit to implement efficient decoding (residue representation data is decoded separately, as illustrated in FIG. 13). The 12.01 GB/s core representation is decompressed to 58 Tb/s for the final light field display. Note that this core representation does not include the residue representations necessary to render occlusions. The $$\frac{58 \text{ Tb}/s}{12.01 \text{ GB}/s}$$

provides a compression ratio of 4833:1; while this is a high performance compression ratio, the reconstructed light field data may still exhibit occlusion-based artifacts unless residue representation data is included in the reconstruction.

For the illustrative embodiment shown in FIG. 8, data is decoded by reconstructing individual layered scene decomposition layers and merging the reconstructed layers into an inner frustum volume layer. For an alternate embodiment, such as illustrated in FIG. 9, the data is decoded by reconstructing individual layered scene decomposition layers and merging the reconstructed layers into an inner frustum volume layer and an outer frustum volume layer.

A single layered scene decomposition layer can be reconstructed from given sampling scheme sampling of data using view synthesis techniques from the field of Image-Based Rendering which are known in the art. For example, Graziosi et al. specify using reference elemental images to reconstruct the light field in a single pass. This method uses reference elemental images offset from the reconstructed image in multiple dimensions. Because the elemental image data represents three dimensional scene points (including RGB color and disparity), pixels are decoded as a nonlinear function (although fixed on the directional vector between the reference and target elemental images), therefore requiring a storage buffer of equal size to the decoding reference elemental images. When decoding larger elemental images, this can create memory storage or bandwidth constraints, depending on the decoding hardware.

For a light field display with an elemental image size of 512×512 pixels with 24-bit color, a decoder requires a buffer capable of storing 512×512=262,144 24-bit values (without disparity bits in this example). Current high-performance FPGA devices provide internal block memory (BRAM) organized as 18/20-bit wide memory and 1024 memory locations which can be used as a 36/40-bit wide memory with 512 memory locations. A buffer capable of reading and writing an image in the same clock cycle is large enough to hold two reference elemental images, as the nonlinear decoding process causes the write port to use a non-deterministic access pattern. Implementing this buffer in an FPGA device for a 512×512 pixel image requires 1024 BRAM blocks. Depending on the reconstruction algorithm used, multiple buffers may be required in each decoder pipeline. To meet the data rate of a high-density light field display, the system may require more than one hundred parallel pipelines, which is magnitudes more pipelines than current FPGA devices. Because each buffer requires an independent read/write port, it may not be possible to implement such a system on current ASIC devices.

The present disclosure circumvents buffer and memory limitations by dividing the pixel reconstruction process into multiple, single-dimension stages. The present disclosure implements one dimensional reconstruction to fix the directional vector between the reference elemental images and the target to a rectified path. While reconstruction remains nonlinear, the reference pixel to be translated to the target location is locked to the same row or column location of the target pixel. Therefore, decoder buffers only need to capture one row or one column at a time. For the elemental image of 512×512 pixels with 24-bit color described above, the decoder buffer is organized as a 24-bit wide, 1024 deep memory requiring two 36/40×512 BRAM. Therefore, the present disclosure has reduced the memory footprint by a factor of 512, or multiple magnitudes. This allows a display pixel fill rate requiring over a hundred decoding pipelines to be supported by current FPGA devices.

Multi-stage decoding architectures require two stages to reconstruct the two dimensional pixel array in a light field display. The two stages are orthogonal to one another and reconstruct rows or columns of elemental images. The first decoding stage may require a pixel scheduler to ensure that output pixels ordered to be compatible with the next stage input pixels. Due to the extremely high bandwidth required by each decoding stage, some output pixels from a previous stage may need to be reused to reduce local storage requirements. In this case, an external buffer can be used to capture all of the output pixels from a first stage so the subsequent decoding stage can efficiently access pixel data, reducing logic resources and memory bandwidth.

The present disclosure's multi-stage decoding with an external memory buffer allows the decoding process to transfer the required memory bandwidth from expensive on-die memory to lower cost memory devices such as double data rate (DDR) memory devices. A high-performance decoding pixel scheduler ensures maximum reference pixel reuse from this external memory buffer, allowing the system to use narrower or slower memory interfaces.

The disclosures of all patents, patent applications, publications and database entries referenced in this specification are hereby specifically incorporated by reference in their entirety to the same extent as if each such individual patent, patent application, publication and database entry were specifically and individually indicated to be incorporated by reference.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

REFERENCE LIST

ALPASLAN, ZAHIR Y., E L-GHOROURY, HUSSEIN S., CAI, JINGBO. "Parametric Characterization of Perceived Light Field Display Resolution". pages 1241-1245, 2016.
BALOGH, TIBOR, KOVÁCS. The Holovizio system—New opportunity offered by 3D displays. Proceedings of the TMCE, (May):1-11, 2008.
BANKS, MARTIN S., DAVID M. HOFFMAN, JOOHWAN KIM AND GORDON WETZSTEIN. "3D Displays" Annual Review of Vision Science. 2016. pp. 397-435.
CHAI, JIN-XIANG, XIN TONG, SHING-CHOW CHAN, AND HEUNG-YEUNG SHUM. "Plenoptic Sampling"
CHEN, A., WU M., ZHANG Y., LI N., LU J., GAO S., and YU J., 2018. "Deep Surface Light Fields". Proc. ACM Comput. Graph. Interact. Tech. 1, 1, Article 14 (July 2018), 17 pages. DOI:https://doi.org/10.1145/3203192
CLARK, JAMES J., MATTHEW R. PALMER AND PETER D. LAWRENCE. "A Transformation Method for the Reconstruction of Functions from Nonuniformly Spaced Samples" IEEE Transactions on Acoustics, Speech, and Signal Processing. October 1985. pp 1151-1165. Vol. ASSP-33, No. 4.
DO, MINH N., DAVY MARCHAND-MAILLET AND MARTIN VETTERLI. "On the Bandwidth of the Plenoptic Function" IEEE Transactions on Image Processing. pp. 1-9.
DODGSON, N. A. Analysis of the viewing zone of the Cambridge autostereoscopic display. Applied optics, 35(10):1705-10, 1996.
DODGSON, N. A. Analysis of the viewing zone of multi-view autostereoscopic displays. Electronic Imaging 2002. International Society for Optics and Photonics, pages pp 254-265, 2002.
GORTLER, STEVEN J., RADEK GRZESZCZUK, RICHARD SZELISKI, AND MICHAEL F. COHEN. "The Lumigraph" 43-52.
GRAZIOSI, D. B., APLASLAN, Z. Y., E L-GHOROURY, H. S., Compression for Full-Parallax Light Field Displays. Proc. SPIE 9011, Stereoscopic Displays and Applications XXV, (MARCH), 90111A. 2014.
GRAZIOSI, D. B., APLASLAN, Z. Y., E L-GHOROURY, H. S., Depth Assisted Compression of Full Parallax Light Fields. Proc. SPIE 9391, Stereoscopic Displays and Applications XXVI, (FEBRUARY), 93910Y. 2015.
HALLE, MICHAEL W. AND ADAM B. KROPP. "Fast Computer Graphics Rendering for Full Parallax Spatial Displays". Proc. SPIE 3011, Practical Holography XI and Holographic Materials III, (10 Apr. 1997).
HALLE, MICHAEL W. Multiple Viewpoint Rendering. In Proceedings of the 25th annual conference on Computer graphics and interactive techniques (SIGGRAPH '98). Association for Computing Machinery, New York, NY, USA, 243-254.
JANTET, VINCENT. "Layered Depth Images for Multi-View Coding" Multimedia. pp. 1-135. Universite Rennes 1, 2012. English.
LANMAN, D., WETZSTEIN, G., HIRSCH, M., AND RASKAR, R., Depth of Field Analysis for Multilayer Automultiscopic Displays. Journal of Physics: Conference Series, 415(1):012036, 2013.
LEVOY, MARC, AND PAT HANRAHAN. "Light Field Rendering" SIGGRAPH. pp. 1-12.
MAARS, A., WATSON, B., HEALEY, C. G., Real-Time View Independent Rasterization for Multi-View Rendering. Eurographic Proceedings, The Eurographics Association. 2017.
MARSCHNER, STEPHEN R. AND RICHARD J. LOBB. "An Evaluation of Reconstruction Filters for Volume Rendering" IEEE Visualization Conference 1994.
MASIA, B., WETZSTEIN, G., ALIAGA, C., RASKAR, R., GUTIERREZ, D., Display adaptive 3D content remapping. Computers and Graphics (Pergamon), 37(8):983-996, 2013.
MATSUBARA, R., ALPASLAN, ZAHIR Y., E L-GHOROURY, HUSSEIN S., Light Field Display Simulation for Light Field Quality Assessment. Stereoscopic Displays and Applications XXVI, 7(9391):93910G, 2015.
PIAO, YAN, AND XIAOYUAN YAN. "Sub-sampling Elemental Images for Integral Imaging Compression" IEEE. pp. 1164-1168. 2010.
VETRO, ANTHONY, THOMAS WIEGAND, AND GARY J. SULLIVAN. "Overview of the Stereo and Multiview Video Coding Extensions of the H.264/MPEG-4 AVC Standard." Proceedings of the IEEE. pp. 626-642. April 2011. Vol. 99, No. 4.
WETZSTEIN, G., HIRSCH, M., Tensor Displays: Compressive Light Field Synthesis using Multilayer Displays with Directional Backlighting. 1920.
WIDMER, S., D. PAJAK, A. SCHULZ, K. PULLI, J. KAUTZ, M. GOESELE, AND D. LUEBKE. An Adaptive Acceleration Structure for Screen-space Ray Tracing. Proceedings of the 7th Conference on High-Performance Graphics, HPG'15, 2015.

ZWICKER, M., W. MATUSIK, F. DURAND, H. PFISTER. "Antialiasing for Automultiscopic 3D Displays" Eurographics Symposium on Rendering. 2006.

The invention claimed is:

1. A computer implemented light field sampling method comprising:
   receiving a first data set comprising a plurality of light fields, each of the plurality of light fields associated with a light field projector in an array of light field projectors, each light field projector having an associated set of light field projector rays;
   sampling each light field in the plurality of light fields using the set of light field projector rays for each light field projector according to a nearest neighbor interpolation scheme to construct a canonical ray sample for each light field projector;
   mapping each canonical ray sample to a corresponding light field projector ray to produce a mapped light field projector ray and canonical image based on the plurality of light fields; and
   defining a distance for each light field projector to a display plane based upon the mapped light field projector ray.

2. The method of claim 1, wherein mapping each canonical ray sample to a corresponding light field projector ray is performed for two adjacent canonical ray samples.

3. The method of claim 2, wherein the two adjacent canonical ray samples are mapped to parallel sets of light field projector rays to produce parallel samples or are mapped to distinct light field projector rays in their corresponding light field projectors to produce diverging samples.

4. The method of claim 3, wherein the parallel samples and the diverging samples produce a non-uniform sampling pattern.

5. The method of claim 1, wherein the distance of each light field projector to the display plane is represented by a depth value, dp and is defined by a display plane size.

6. The method of claim 5, further comprising quantifying an effective resolution value at the depth value, $d_p$.

7. The method of claim 6, wherein the effective resolution value is calculated by dividing the display plane size by a largest sampling distance.

8. The method of claim 1, wherein the plurality of light fields is partitioned into a plurality of inner frustum data layers and a plurality of outer frustum data layers, relative to the display plane.

9. The method of claim 8, wherein at least one effective resolution value is calculated for each data layer in the plurality of inner frustum data layers and the plurality of outer frustum data layers.

10. The method of claim 8, wherein each data layer is defined by a frustum depth value and a depth value range, relative to the display plane.

11. The method of claim 10, wherein the frustum depth value is measured from the display plane to a first bounding plane of each data layer.

12. The method of claim 10, wherein each inner frustum data layer has a unique frustum depth value.

13. The method of claim 10, wherein each outer frustum data layer has a unique frustum depth value.

14. The method of claim 1, further comprising reconstructing an intensity value for each canonical ray based on a resampling operation performed on intensity values contained in the set of light field projector rays.

15. The method of claim 14, wherein each set of light field projector rays has a spot width.

16. The method of claim 15, wherein the spot width can be used to describe a physical reconstruction of the light field by giving each intensity value a physical angular spread.

* * * * *